United States Patent
Morar

(10) Patent No.: US 10,932,531 B2
(45) Date of Patent: Mar. 2, 2021

(54) FASTENING DEVICE

(71) Applicant: Florin Morar, Hackensack, NJ (US)

(72) Inventor: Florin Morar, Hackensack, NJ (US)

( * ) Notice: Subject to any disclaimer, the term of this patent is extended or adjusted under 35 U.S.C. 154(b) by 0 days.

(21) Appl. No.: 16/360,565

(22) Filed: Mar. 21, 2019

(65) Prior Publication Data

US 2019/0216179 A1 Jul. 18, 2019

Related U.S. Application Data

(63) Continuation-in-part of application No. PCT/US2017/043224, filed on Jul. 21, 2017, which is a continuation-in-part of application No. 15/216,346, filed on Jul. 21, 2016, now Pat. No. 10,292,462, application No. 16/360,565, which is a continuation-in-part of application No. 15/216,346, filed on Jul. 21, 2016, now Pat. No. 10,292,462.

(51) Int. Cl.
*A44B 18/00* (2006.01)
*A44B 17/00* (2006.01)
*A44B 19/08* (2006.01)
*B23B 3/06* (2006.01)

(52) U.S. Cl.
CPC ...... *A44B 18/0015* (2013.01); *A44B 17/0058* (2013.01); *A44B 18/0049* (2013.01); *A44B 19/08* (2013.01); *B23B 3/06* (2013.01)

(58) Field of Classification Search
CPC ..... A44B 19/08; A44B 19/26; A44B 18/0011; A44B 18/0015; Y10T 24/2536
See application file for complete search history.

(56) References Cited

U.S. PATENT DOCUMENTS 1,703,924 A 3/1929 Cobb
2,082,619 A 6/1937 Dau
(Continued)

FOREIGN PATENT DOCUMENTS

EP 1084641 A2 3/2001
FR 2112720 A5 * 6/1972 ............. A44B 19/04
(Continued)

OTHER PUBLICATIONS

Extended European Search Report for Application No. EP17831931. 5, dated Nov. 20, 2019 (8 pages).

*Primary Examiner* — Victor D Batson
*Assistant Examiner* — Matthew J Sullivan
(74) *Attorney, Agent, or Firm* — St. Onge Steward Johnston & Reens LLC

(57) ABSTRACT

A fastening device has a first fastening member with a plurality of teeth and a second fastening member with a plurality of sockets which are sequentially engagable in tooth and socket pairs in an engagement direction by relative rotation of the tooth and socket. Each tooth has a first surface and a second surface fixed relative to the first surface. Each socket has a recess defined by a first wall and second wall fixed relative to the first wall. Upon engagement, the first and second surfaces of the tooth abut the respective first and second walls of the recess and prevent relative movement of the tooth in the engagement direction and a portion of the first wall of the socket closely abutting the first surface of the tooth is disposed between the tooth and a portion of the first fastening member and prevents relative separation of the tooth and socket.

24 Claims, 30 Drawing Sheets

(56) References Cited

U.S. PATENT DOCUMENTS

| | | | |
|---|---|---|---|
| 2,292,985 A * | 8/1942 | Banyai | A44B 19/08 24/410 |
| 2,397,801 A | 4/1946 | Mitchell | |
| 2,709,290 A | 5/1955 | Rosenthal | |
| 2,715,254 A * | 8/1955 | Tschappu | A44B 19/14 24/401 |
| 2,841,850 A | 7/1958 | Zahorski | |
| 2,869,207 A | 1/1959 | Bernstein | |
| 3,130,464 A | 4/1964 | Barlow | |
| RE26,629 E * | 7/1969 | Nealis | A44B 18/0053 24/401 |
| 3,462,805 A * | 8/1969 | Quisling | A44B 19/08 24/586.11 |
| 3,462,806 A * | 8/1969 | Quisling | A44B 19/08 24/401 |
| 3,494,006 A | 2/1970 | Brumlik | |
| 3,600,766 A | 8/1971 | Alberts | |
| 3,941,383 A | 3/1976 | Clarke | |
| 3,961,398 A * | 6/1976 | Herterich | A44B 18/0019 24/401 |
| 3,969,794 A | 7/1976 | Ebata | |
| 4,546,026 A | 10/1985 | Kowalski | |
| 4,581,792 A | 4/1986 | Spier | |
| 4,677,011 A | 6/1987 | Matsuda | |
| 5,640,744 A | 6/1997 | Allan | |
| 5,896,629 A | 4/1999 | Van Hooreweder | |
| 6,190,594 B1 | 2/2001 | Gorman et al. | |
| 6,243,927 B1 | 6/2001 | Matsushima et al. | |
| 6,260,240 B1 | 7/2001 | Akashi et al. | |
| 6,282,926 B1 | 9/2001 | Matsuda et al. | |
| 6,287,665 B1 | 9/2001 | Hammer | |
| 6,393,678 B1 | 5/2002 | Fildan et al. | |
| 6,481,064 B2 | 11/2002 | Kawahara | |
| 7,950,114 B2 | 5/2011 | Duffy | |
| 8,291,554 B2 | 10/2012 | Duer | |
| 8,826,499 B2 | 9/2014 | Tempesta | |
| 9,480,931 B1 | 11/2016 | Samo et al. | |
| 9,649,824 B2 | 5/2017 | Chandrasekaran et al. | |
| 2002/0007534 A1 | 1/2002 | Kawahara | |
| 2003/0115727 A1 | 6/2003 | Yokozeki et al. | |
| 2008/0155798 A1 | 7/2008 | Efremova et al. | |
| 2012/0266443 A1 | 10/2012 | Poulakis | |
| 2016/0324273 A1 * | 11/2016 | Hahizume | A44B 19/08 |

FOREIGN PATENT DOCUMENTS

| | | |
|---|---|---|
| WO | 8301182 A1 | 4/1983 |
| WO | 9700629 A1 | 1/1997 |
| WO | 2006011724 A1 | 2/2006 |

* cited by examiner

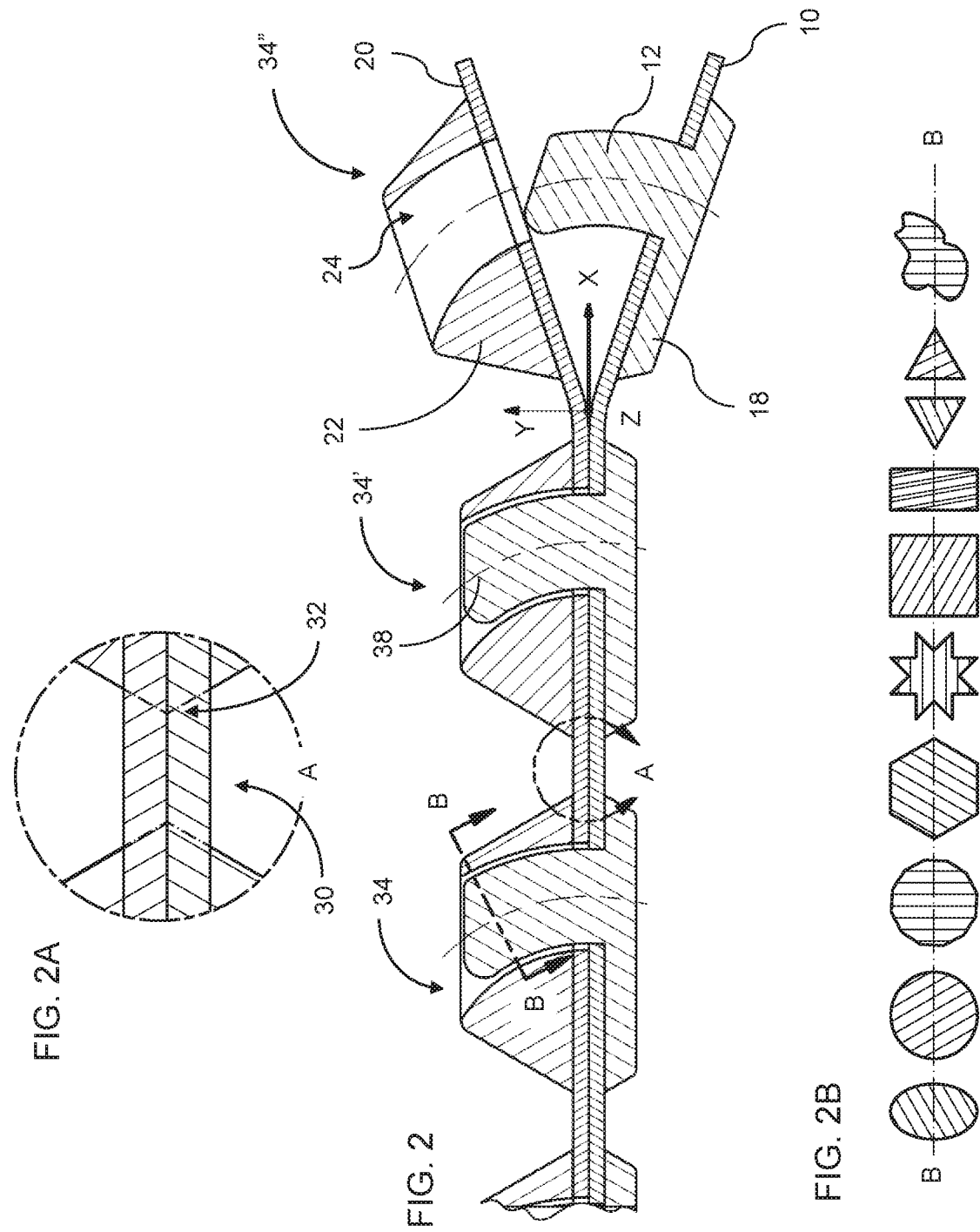

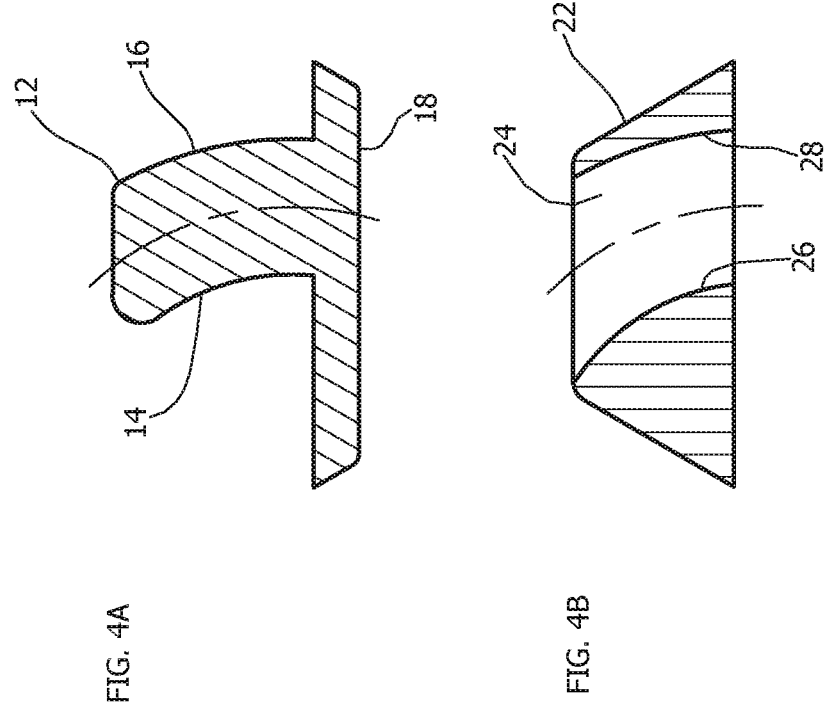

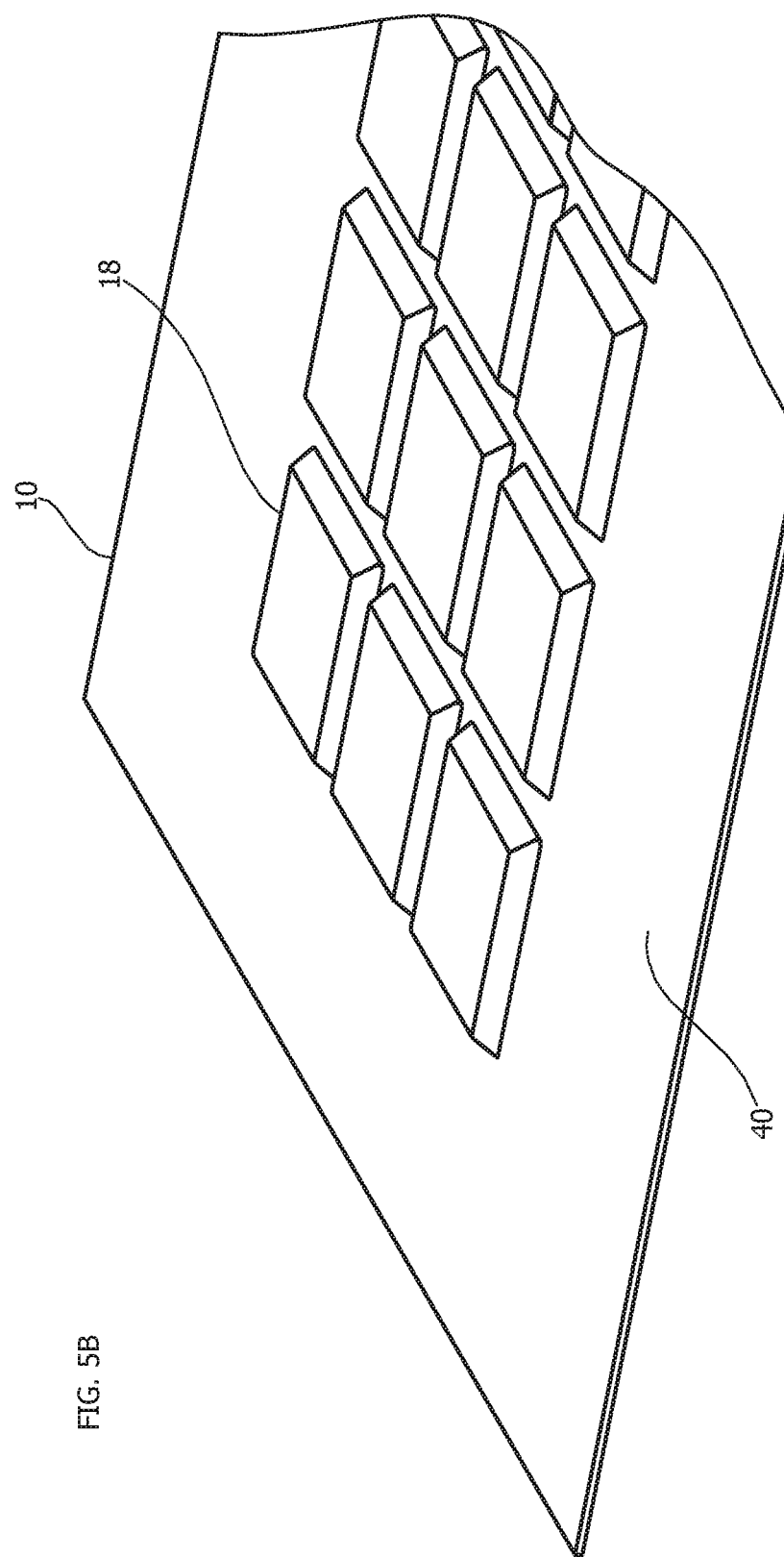

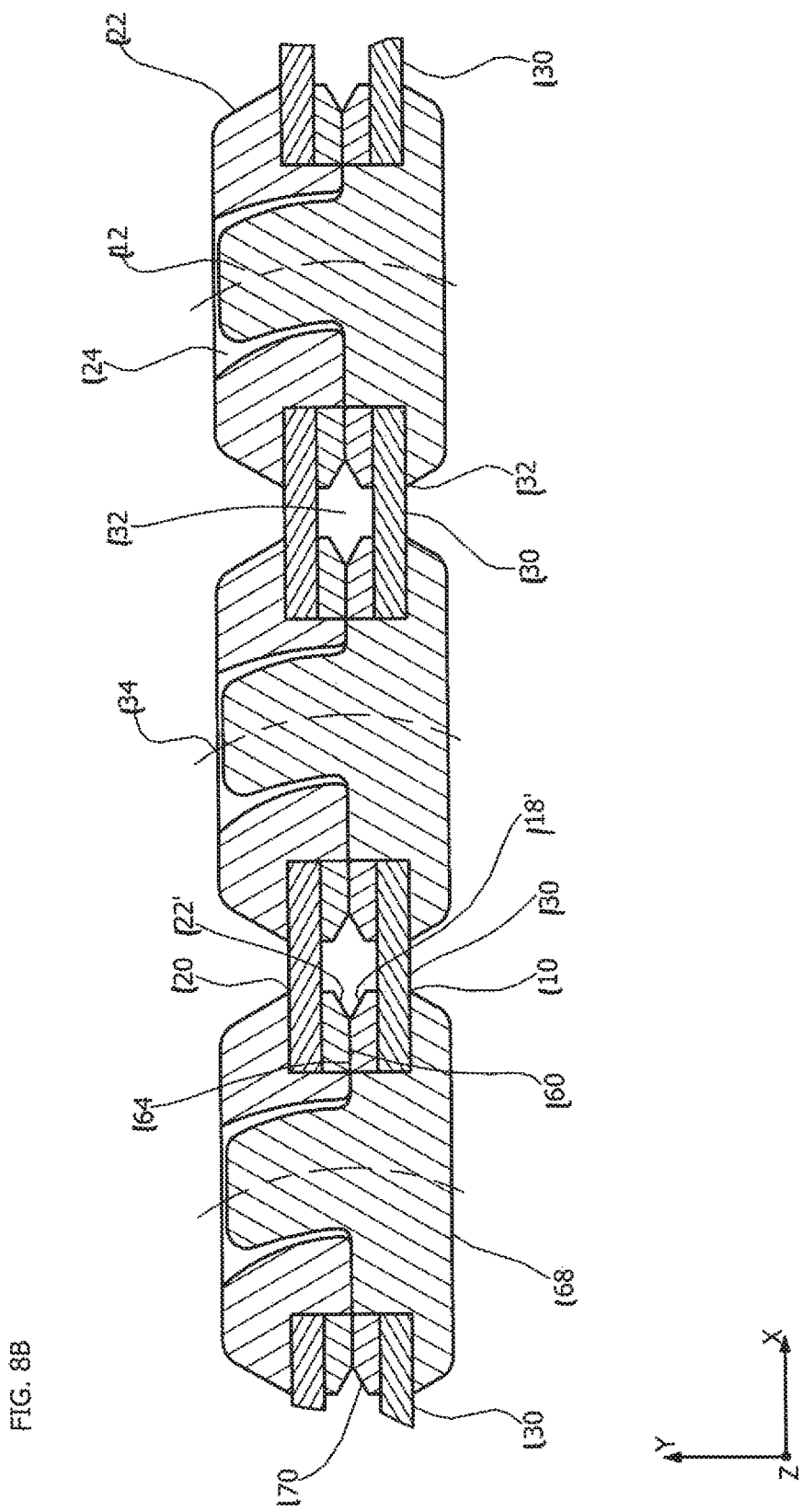

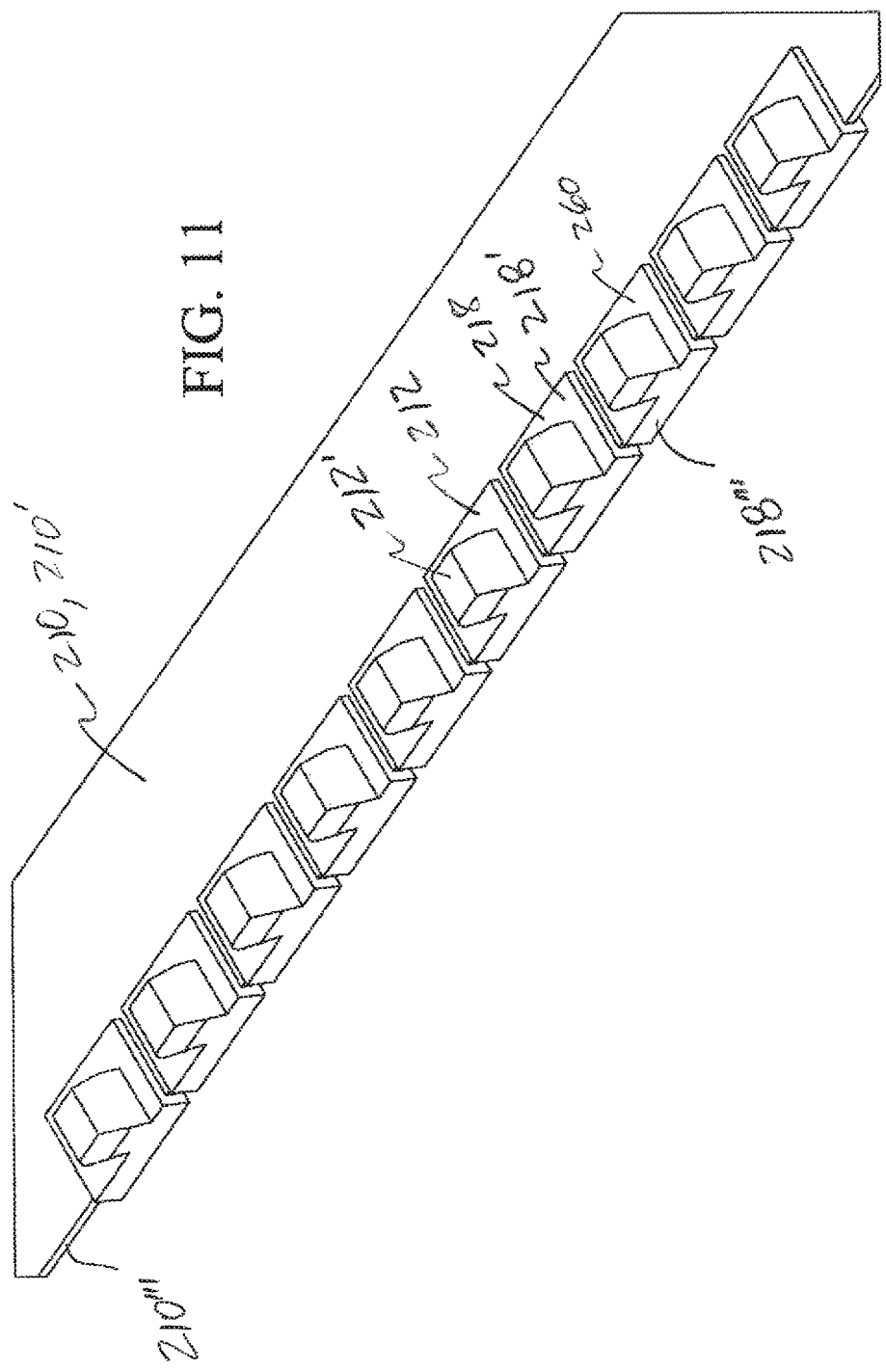

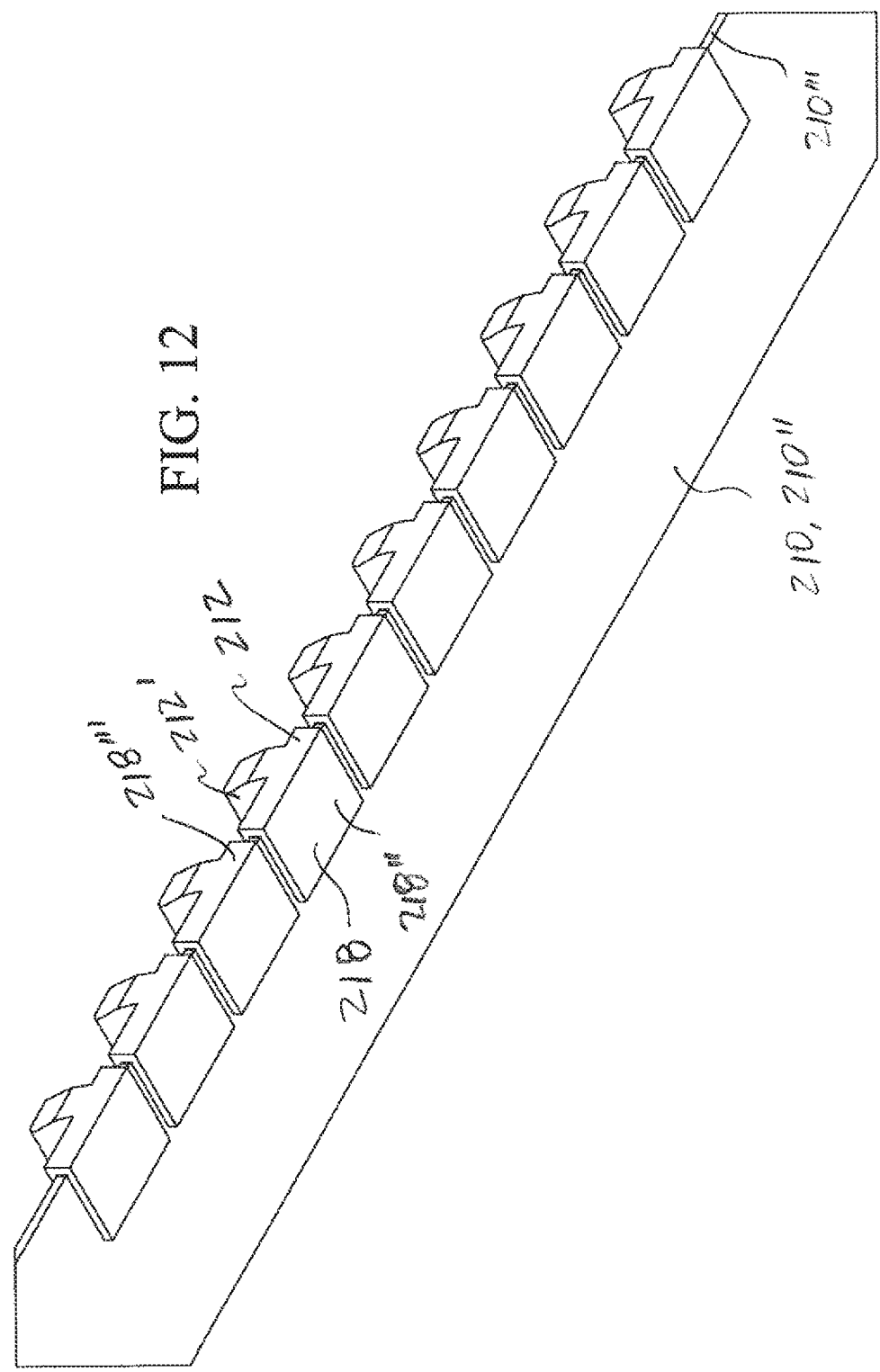

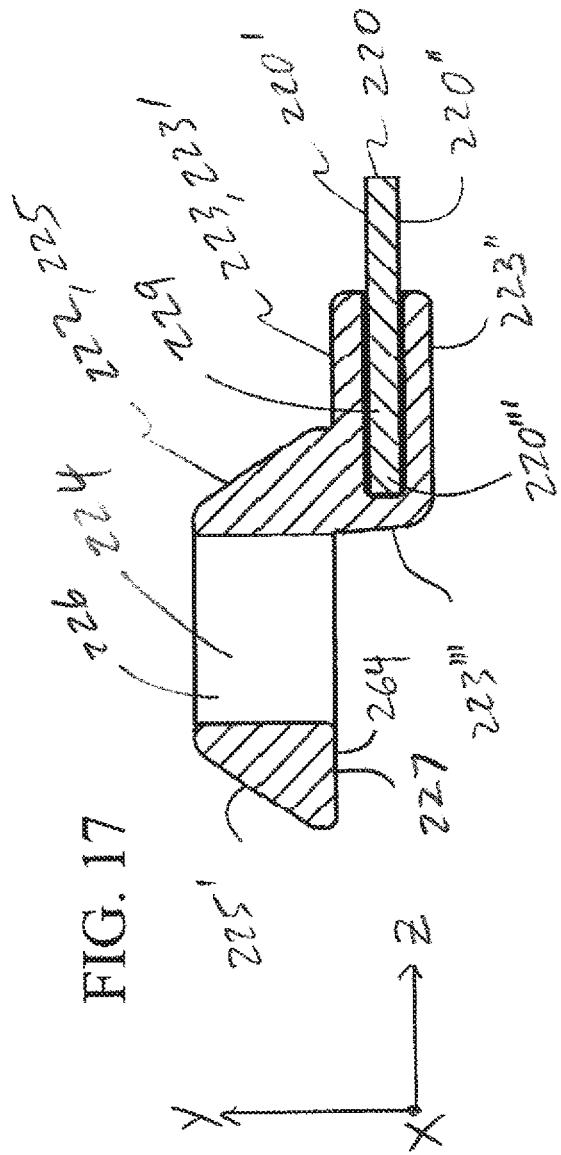

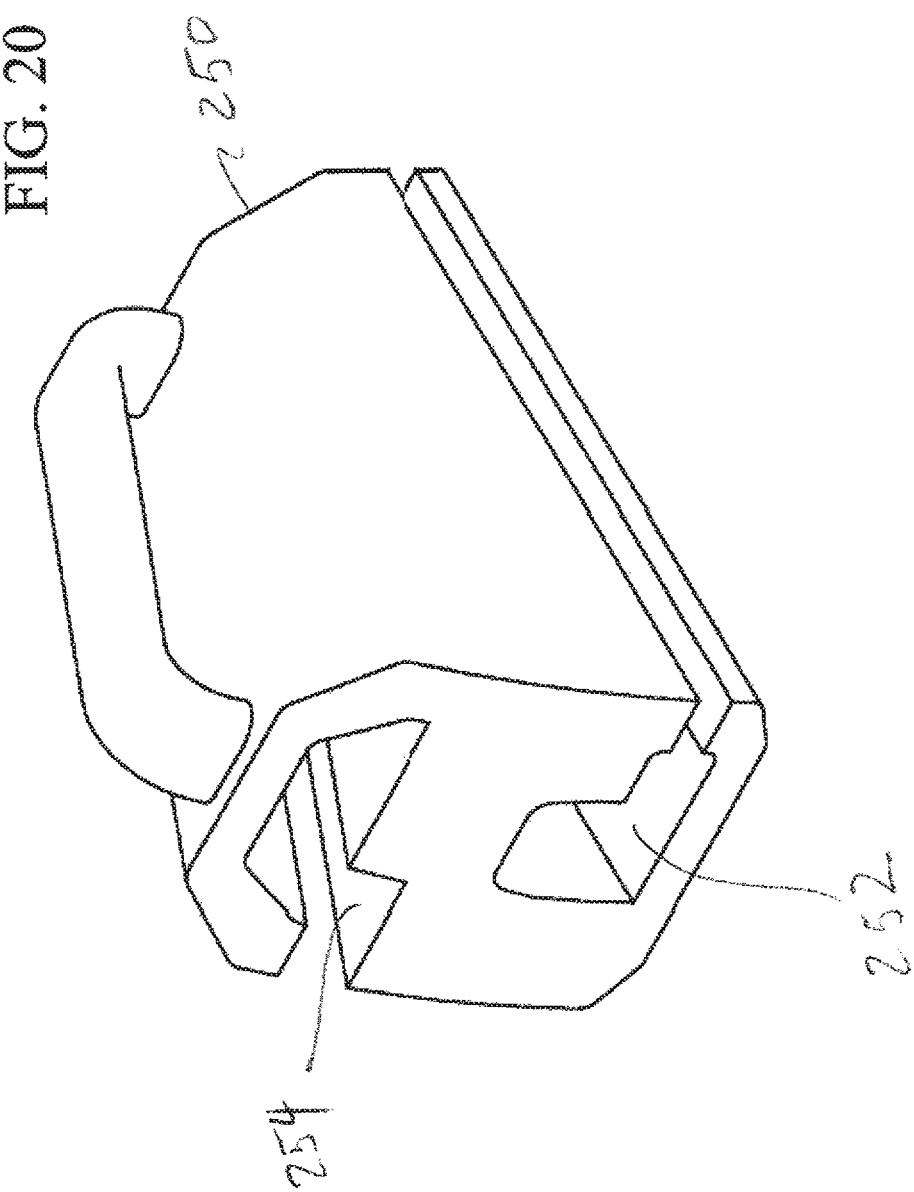

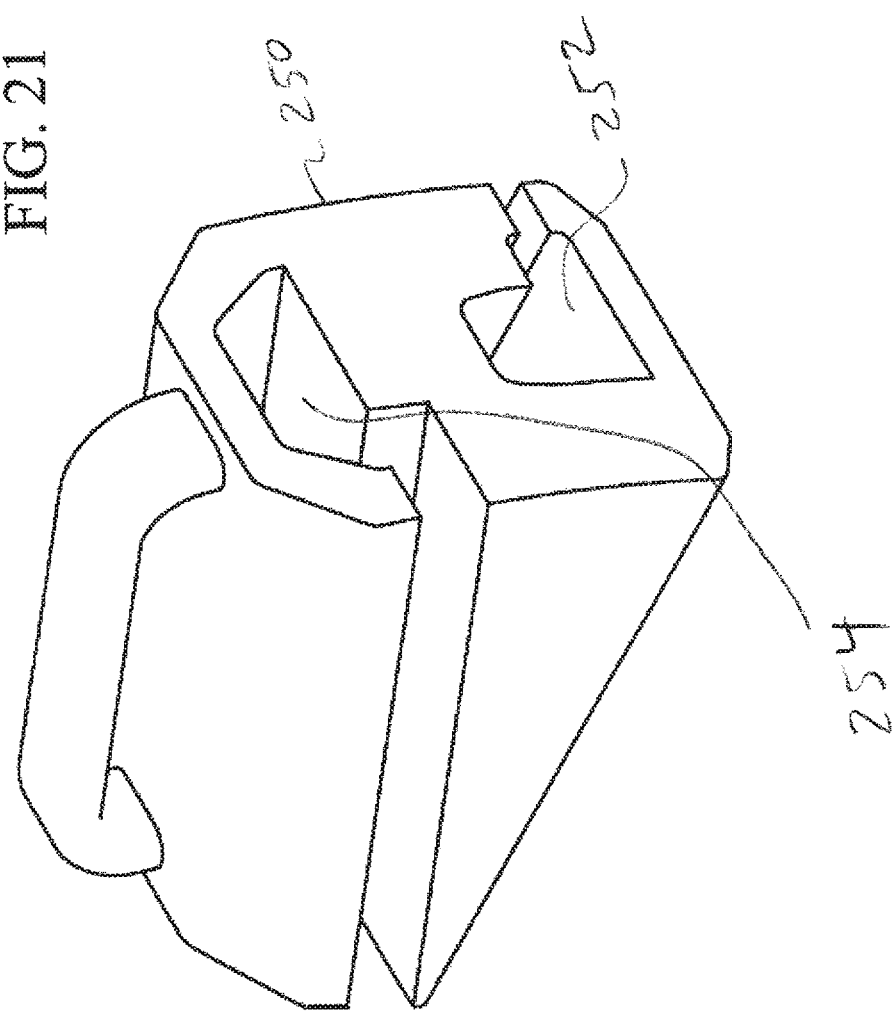

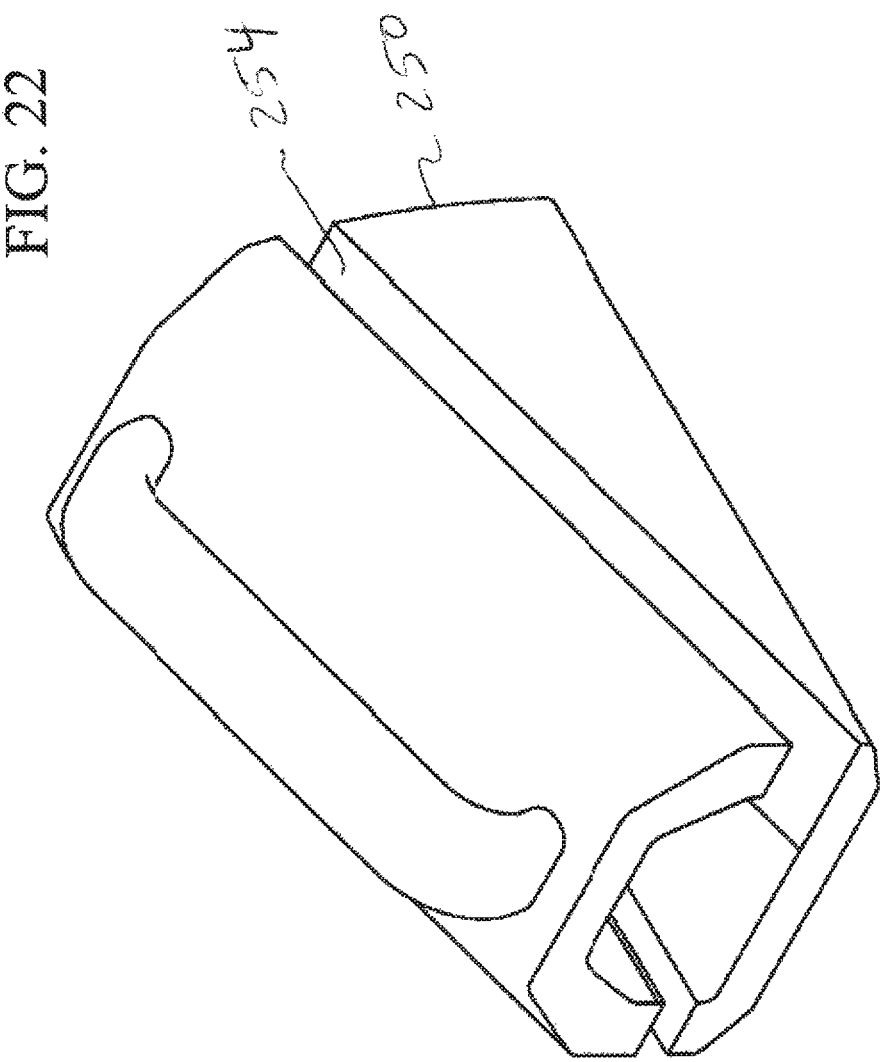

FASTENING DEVICE

FIELD OF THE INVENTION

The technology relates to the field of fasteners for use, for example, on clothing, luggage, outdoor gear, etc. More specifically, the technology discloses a fastener for such uses as an alternative to zippers, snaps or buttons, and hook and loop (Velcro) applications commonly used.

BACKGROUND OF THE INVENTION

Many applications require the ability to easily fasten and unfasten two separate pieces of an article. Typical examples include clothing and jackets as well as luggage, purses, and other transportation receptacles, sporting goods, camping gear such as tents and sleeping bags, belts and straps, and other applications. Commonly, such items employ zippers, snaps or buttons, or Velcro fasteners to facilitate this need. Examples of such technology are depicted in U.S. Pat. Nos. 3,941,383, 3,969,794, 4,546,026, 4,677,011, 5,640,744, 6,243,927, 6,393,678, and 6,481,064. The teachings of these documents are hereby incorporated in their entireties.

However, zipper, button, and Velcro technologies suffer from several drawbacks. Zippers can fail under substantial load and frequently get stuck when material gets caught between the teeth. Also zippers can be loud when fastening or unfastening. Similarly, snaps/buttons can break or become inoperable when dirt or debris get caught within, making them far less effective. Velcro applications also have similar drawbacks, create noise when engaging and disengaging and becoming less effective over time after catching dirt and debris. Further, the clothing or other item's material often gets caught in the Velcro, sometimes causing damage.

Accordingly, there remains a need in the art for a robust fastening device that can be fastened and unfastened quietly and easily, can continue to operate effectively over time despite repeated use. It is an objective of the present technology to overcome these drawbacks and provide such a fastener capable of quick and effective engagement and optional disengagement.

SUMMARY OF THE INVENTION

To achieve the objectives, the present technology employs one or more rows and columns of sequentially engageable tooth and socket pairs. The sockets are provided on a first portion of the fastening device and the teeth are provided on a second portion. The rows of tooth and socket pairs are engaged sequentially in a single direction. Once the following row is engaged, the previous row is locked in the engaged state. In some embodiments, a slider may be provided to facilitate engagement and disengagement of the tooth and socket pairs. In some embodiments, a rubber gasket or alternative device may be inserted between the opposing portions of the fastening device, thereby creating a watertight seal when the pairs of teeth and sockets have been engaged.

In a particular advantageous embodiment of the technology, a fastening device is provided with a first fastening member having a plurality of teeth and a second fastening member having a plurality of sockets. Each socket has a recess sized and shaped to receive and engage with one of the plurality of teeth. The plurality of teeth and sockets are sequentially engageable in tooth and socket pairs. Given the size and shape of the teeth and socket recesses, the tooth and socket pairs are engageable only in a single direction parallel to a first axis (X) that is orthogonal to second (Z) and third orthogonal axes (Y). Each tooth has at least a first and second surface wherein the first and second surfaces are spaced apart parallel to the first axis (X) in the engagement direction. Similarly, each recess is defined at least in part by first and second walls in an interior of the socket, the first and second walls are fixed relative to one another and spaced apart parallel to the first axis (X) in the engagement direction. In some embodiments, the recess may be further defined by opposed sidewalls interconnecting the first and second walls and thereby fixing the first and second walls relative to one another.

Each tooth and socket pair is engageable through relative rotation of the associated tooth and/or socket. Once a tooth and socket pair is in an engaged position, wherein the tooth is maximally received within the recess of the associated socket, the first and second surfaces of the tooth closely abut the respective first and second walls of the socket, thereby preventing relative movement of the tooth and socket parallel to the first axis (X). Furthermore, at least a portion of the first wall of the socket that is closely abutting the first surface of the tooth is disposed between a portion of the tooth (preferably toward the distal end of the tooth) and a portion of the first fastening member, thereby preventing relative separation movement of the tooth and socket parallel to the third axis (Y).

Embodiments of the technology may also include at least one additional tooth and socket pair following the first pair sequentially in the engagement direction. Once the first tooth and socket pair has been engaged, the relative movement of the tooth and socket of the second pair is substantially limited to relative rotational movement about a first pivot axis, which is parallel to the second axis (Z). The tooth and socket of the second pair are engageable through relative pivoting about the first pivot axis.

Embodiments of the technology may also include a third tooth and socket pair following the second pair sequentially in the engagement direction. Like the relationship of the first and second tooth and socket pairs described above, the relative movement of the tooth and socket of the third pair is substantially limited to relative rotational movement about a second pivot axis, also parallel to the second axis (Z), when the second tooth and socket pair is engaged. Likewise, the tooth and socket of the third pair are engageable through relative pivoting about the second pivot axis. Furthermore, engaging the tooth and socket of the third pair substantially prevents any relative rotational movement of the tooth and socket of the second pair about the first pivot axis, effectively locking the tooth and socket of the second pair in the engaged position so long as the third pair remains engaged.

When viewing the profiles of the teeth parallel to the second axis (Z), many cross-sectional profile shapes are possible. Preferably, at least a portion of the first surface of each respective tooth is concave and has a center of curvature at a tooth center of curvature which is preferably substantially aligned with the pivot axis of the associated tooth and socket pair. For example, when a first tooth and socket pair are engaged, substantially limiting the relative movement of the tooth and socket of a second pair about a first pivot axis, the center of curvature of the first surface of the second tooth is substantially aligned with the first pivot axis. Thereby, the second tooth and socket rotating about the first pivot axis will smoothly engage given the second tooth's center of curvature located at substantially the same location.

In some embodiments, the first wall of the socket may also be curved, at least along a portion of the first wall. To permit engagement with the first surface of the associated tooth, the curved portion of the first wall of the socket is convex, complementary to the shape of the curved portion of the first wall of the tooth. The center of curvature of the first wall of the socket is on a socket center of curvature and is preferably substantially aligned with the center of curvature of the first surface of the associated tooth and, accordingly, with the pivot axis associated with the tooth and socket pair. Thus, the rotation of the tooth and socket about the pivot axis would facilitate a smooth engagement of the tooth and socket pair.

Furthermore, in some embodiments, the second surface of the tooth and the second wall of the socket may also have curved portions. Preferably, at least a portion of the second surface of the tooth is convex with a center of curvature on the tooth center of curvature. Likewise, at least a portion of the second wall is convex with a center of curvature on the socket center of curvature.

Those of skill in the art will recognize the possible variations on the cross-sectional shape of the teeth and sockets. It remains important, however, that a portion of the first wall of the socket remain imposed between a portion, preferably the distal end, of the tooth's first surface and the first fastening member when fully engaged to ensure the tooth and socket pair cannot be disengaged merely through relative movement in a direction parallel to the third axis (Y).

In embodiments wherein the first and second surfaces of the teeth employ a smooth curve over substantially the full length of the tooth (i.e., from a proximal end to a distal end) and share a common center of curvature, the width of the tooth is constant when measured parallel to the radius of curvature of the tooth, at least for a substantial portion of the length of the tooth. In other words, because the first and second surfaces of the tooth have the same center of curvature, the cross-sectional width of the tooth is constant as measured parallel to the radius of curvature, for at least a portion of the length of the tooth. The radius from the center of curvature to the first surface is constant and the radius between the center of curvature to the second surface is also constant, though greater, making the cross-sectional width constant parallel to the radius of curvature along at least a portion of the length of the tooth. Note that this may be true for substantial portions of the tooth but not necessarily for the entire length of the tooth. For example, in some embodiments, the top surface of the tooth is flat parallel to the first axis (X).

The same principals apply to the recesses in the sockets. When the first and second walls defining the recess share a center of curvature, the cross-sectional width of the recess is constant, as measured parallel to the radius of curvature, at lease over a portion of the length of the recess. Again, in some embodiments this is true for substantial portions of the recess but not the entire length, as the top of the socket and recess may also be flat (e.g. parallel to the first axis (X)). Other arrangements and variations will be understood by those skilled in the art.

Furthermore, in addition to having a constant cross sectional width, the shape of the cross section of the tooth may be constant when taken parallel to a plane defined by the radius of curvature and the second axis (Z), at least for a portion of the tooth's length. This constant cross-section applies, however, only when both the first and second surfaces of the tooth have the same center of curvature. Furthermore, in some embodiments, said cross-section may not be constant along the entire length of the tooth, as the top surface of the tooth may be flat parallel to the first axis (X). Likewise, the shape of the cross section of the recess of the socket may be constant at least over a portion of the recess, when taken in a similar manner (i.e., when taken parallel to a plane defined by the radius of curvature of the socket and the second axis (Z), Those of skill in the art will recognize variations for the shapes of the teeth and sockets as well as the socket recesses. For example, cross-sectional shape of the teeth as discussed above may have a round, oval, square, or rectangular. Other irregular shapes, such as stars, hexagons, octagons, etc. are also possible. The same or similar shapes for the cross-section of the recesses are also possible. The cross-sectional shape of the recess preferably is the same as that of the tooth and/or is complimentary thereto) to receive and engage the associate tooth, but could have any shape capable of so doing. The recess may extend all the way to the top of the socket, creating an opening in the top of the socket, or may terminate within the socket such that the socket has a solid top. Those skilled in the art will recognize the various mechanical and aesthetic advantages of the different arrangements and designs available, and the present technology is not intended to be limited to any of those described herein.

In a preferable embodiment of the technology, the center of curvature of a tooth is located between the tooth and the tooth immediately preceding it sequentially. For example, if the first fastening member has a number of teeth, the center of curvature of the second tooth lies between the first and second teeth, the center of curvature of the third tooth lies between the second and third teeth, etc. Similarly, the plurality of sockets of the second fastening member, each with a recess with a curved portion at least on the first wall, has an associated center of curvature located between the socket and the socket preceding it sequentially. Thus, as with the aforementioned teeth, the center of curvature associated with the second socket lies between the first and second sockets, the center of curvature associated with the third socket lies between the second and third sockets, etc.

In such embodiments, the first fastening member may be adapted to substantially limit movement of the teeth about a tooth pivot region located substantially on the center of curvature of the associated tooth's first and/or second surface. Likewise, the second fastening member may be adapted to substantially limit movement of the sockets about a socket pivot region located substantially on the center of curvature of the associated socket's first and/or second wall. Preferably, both the first and second fastening members will employ such a limitation to the movement of their respective teeth and sockets. It is also preferable that the first and second fastening members are flexible, although those skilled in the art will recognize other possible variations, such as one or both of the fastening members having hinges located at the aforementioned pivot regions, and/or one of the fastening members being rigid.

In some embodiments, each of the plurality of teeth may include a rigid base extending parallel to the first axis (X) and the second axis (Z). The base is located on the proximal end of the tooth, preferably adjacent to the first fastening member. In such embodiments, the tooth pivot regions are formed by flexible portions of the first fastening member disposed between and interconnecting the base portions of the plurality of teeth. Preferably, the length of the flexible portions is less than the length of the tooth bases when length is measured in a direction parallel to the first axis (X). For example, the length of the flexible portions might be no greater than about fifty percent (50%) of the length of the tooth bases, and preferably no greater than about twenty-five percent (25%) of the length of the tooth bases.

Likewise, in some embodiments, the sockets of the second fastening member are rigid and the socket pivot regions are formed by flexible portions of the second fastening member disposed between and interconnecting the sockets. Again, the length of the flexible portions is preferably less than the length of the sockets when length is measured in a direction parallel to the first axis (X). For example, the length of the flexible portions might be no greater than about fifty percent (50%) of the length of the sockets, and preferably no greater than about twenty-five percent (25%) of the length of the sockets.

In some embodiments of the present technology, the first and second fastening members may comprise flexible first and second webs, respectively. The first web may comprise first and second opposing surfaces with a plurality of holes extending therethrough. In such embodiments, each tooth may include a rigid base extending parallel to the first axis (X) from a proximal end of the tooth, whereby the base of each tooth is affixed to the first surface of the first web with the tooth extending through one of the plurality of holes in the first web and protruding from the second surface of the first web. Likewise, the second web may comprise first and second opposing surfaces with a plurality of holes extending therethrough. And each socket may be disposed on the first surface of the second web such that each socket's recess is substantially aligned with one of the plurality of holes in the second web. In this way, when a tooth and socket pair is engaged, the second surface of the first web abuts the second surface of the second web, with the tooth extending through the associated hole in the second web and into the recess of the socket.

Those skilled in the art will recognize that, while the present technology is effective using a single column of tooth and socket pairs, other embodiments may employ two or more columns of tooth and socket pairs. Preferably, when more than one column is used, the tooth and socket pairs are arranged in a regularly spaced rectangular array, though many other arrangements are possible.

The fastening device can be engaged and disengaged manually. Alternatively, a slider may be employed to facilitate engagement of the tooth and socket pairs, whether employing a single column of tooth and socket pairs or multiple columns of tooth and socket pairs. The slider may employ one or more first channels adapted to sequentially receive each tooth—multiple first channels are provided for multiple columns of teeth—and one or more second channels adapted to sequentially receive each socket—multiple second channels are provided for multiple columns of sockets. The first and second channels are adapted to align the respective teeth and sockets along a lateral axis parallel to the second axis (Z) to facilitate engagement of the tooth and socket pairs. In some embodiments of the technology, the slider's one or more first channels may also be adapted to sequentially contact opposed lateral edges of the base of each tooth and its one or more second channels may be adapted to sequentially contact opposing edges of the sockets.

Furthermore, an airtight and/or waterproof embodiment of the technology is also contemplated. In such an embodiment might employ a gasket or seal, such as a compressible elastomeric seal, between the first and second fastening members. The gasket or seal would create a watertight connection when the tooth and socket pairs are engaged, compressing the seal between the first and second fastening members.

The fastening device can be formed in several configurations such as coil, open-end and close-end configurations, and other suitable configurations, and the device can comprise various materials, such as plastic and metal and other suitable materials.

While the present technology has been described with reference to a particular arrangement of parts, features and the like, these are not intended to exhaust all possible arrangements or features, and indeed many other modifications and variations will be ascertainable to those of skill in the art. Other objects of the present technology and its particular features and advantages will become more apparent from consideration of the following drawings and detailed description of the technology.

BRIEF DESCRIPTION OF THE DRAWINGS

FIG. 2 is a cross-sectional elevation view of the first fastening member and associated plurality of teeth and the second fastening member and associated plurality of sockets showing first and second tooth and socket pairs in a fully engaged state and a third tooth and socket pair in a disengaged state according to aspects of the exemplary embodiment of the claimed technology depicted in FIG. 1.

FIG. 2A is a cross-sectional elevation view of the portion of the first and second fastening members between the sequential tooth and socket pairs, referred to as the pivot axis area, according to aspects of the exemplary embodiment of the claimed technology depicted in FIG. 1.

FIG. 2B is a cross-sectional plan view of a variety of possible shapes for the cross-sectional shape of the tooth as taken parallel to the line labeled B-B in FIG. 2 according to aspects of the exemplary embodiment of the claimed technology depicted in FIG. 1.

FIG. 4A is a cross-sectional elevation view of a tooth according to aspects of the exemplary embodiment of the claimed technology depicted in FIG. 1.

FIG. 4B is a cross-sectional elevation view of a socket according to aspects of the exemplary embodiment of the claimed technology depicted in FIG. 1.

FIG. 5B is an isometric depiction of the first fastening member showing the first opposing surface of the first fastening member and the rigid bases of its associated plurality of teeth according to aspects of the exemplary embodiment of the claimed technology depicted in FIG. 1.

FIG. 8B is a cross-sectional elevation view of the first fastening member and associated plurality of teeth and the second fastening member and associated plurality of sockets showing both the first and second tooth and socket pairs in an engaged state according to aspects of the exemplary embodiment of the claimed technology depicted in FIG. 8A.

FIGS. 11 and 12 are perspectives view from the top and bottom, respectively, of an embodiment of the invention showing the first fastening member and teeth.

FIG. 15 is a longitudinal cross section view of a tooth and socket pair, and FIG. 16 is a lateral cross section of the tooth and socket pair, taken along line A-A of FIG. 15.

FIGS. 17 and 18 are longitudinal cross section views, respectively, of a socket and a tooth.

FIGS. 20-22 are perspective view of a slider adapted for the fastening device.

DETAILED DESCRIPTION OF THE INVENTION

Figure 1A:
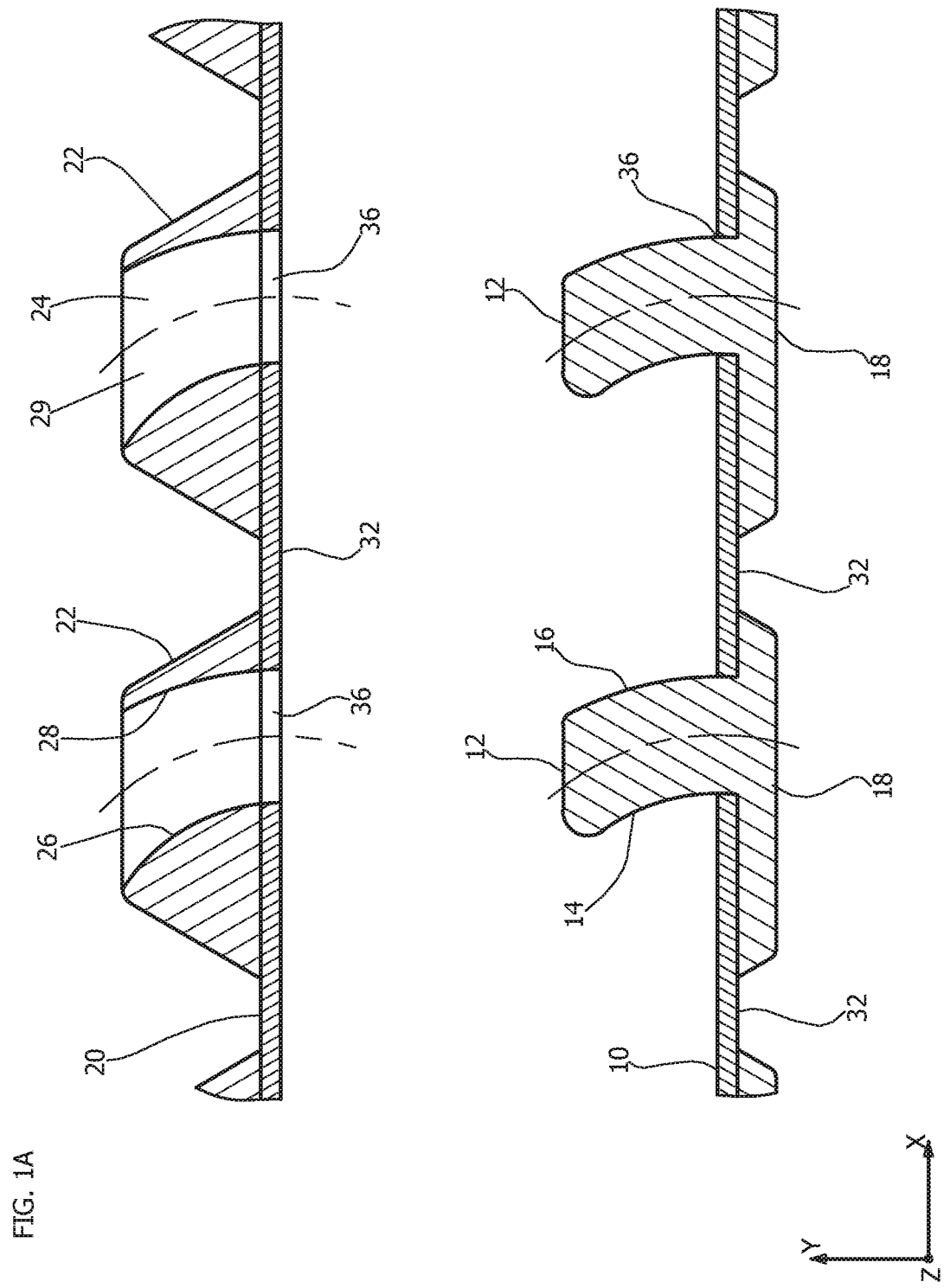
FIG. 1A is a cross-sectional elevation view of the first fastening member and associated plurality of teeth and the second fastening member and associated plurality of sockets showing profiles of the teeth and recesses, according to an embodiment of the claimed technology.

The following detailed description illustrates the technology by way of example, not by way of limitation of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present technology is not limited to those embodiments described hereinafter.

The fastening device described herein is intended as an alternative to the traditional fastening devices used on clothing and the like, including zippers, buttons, Velcro (hook and loop), etc. The technology employs first and second fastening members, which may be attached to, or incorporated into, parts of an article to be joined such as, for example, wearable articles or other articles. Like a zipper, parts of the claimed fastening device would be attached to each fastening member. As depicted in FIG. 1 (A-D), the first fastening member 10 employs a plurality of teeth 12 and the second fastening member 20 employs a plurality of sockets 22. The teeth 12 and sockets 22 are disposed on the associated first fastening member 10 and second fastening member 20 such that the teeth 12 and sockets 22 come together to form tooth and socket pairs 34 upon engagement of the fastening members. The teeth and socket pairs are sequentially engageable in an engagement direction parallel to a first axis (X) (e.g., left to right as depicted in the drawings), which is orthogonal to a second axis (Z) and third axis (Y), which are mutually orthogonal. Each tooth and socket pair is adapted for engagement substantially only by relative rotation of the associated tooth and socket.

Referring to FIGS. 1-6A, each tooth 12 has a base 18 and has a first surface 14 and a second surface 16, where the second surface 16 is opposite and spaced from the first surface 14 in the engagement direction. The relative positions of the first surface 14 and second surface 16 of the tooth 12 are fixed such that the spacing between the first and second surfaces does not change during engagement or disengagement of the fastening device and in particular does not change during any flexure of the first or second fastening members 10, 20.

The first surface 14 preferably has a concave profile as viewed parallel to the second axis (Z), on at least a portion of the first surface 14 or, as depicted, on substantially the entire length of the tooth from a proximal end substantially to a distal end. The second surface 16 has a convex profile as viewed in the same direction, on at least a portion of the second surface 16 or, as depicted, on substantially the entire length of the tooth. Preferably, the curved portions of the first and second surfaces 14, 16 share a common tooth center of curvature which is located adjacent an end of the base 18.

While FIG. 1A depicts an embodiment wherein substantially the entire lengths of the first surface 14 and second surface are curved, this is not the only arrangement possible under the principles of the claimed technology. For example, the curved portions of the first surface 14 and second surface 16 could be limited to only a section thereof. Other possible embodiments will be ascertainable to those skilled in the art.

The first surface 14 of the tooth can have a partially cylindrical concave shape with an axis of curvature which is parallel to the second axis (Z) and passes through the tooth center of curvature. Similarly, the second surface 16 of the tooth 12 can have a partially cylindrical convex shape and can have an axis of curvature in common with that of the first surface 14 of the tooth 12.

Each socket 22 has a recesses 24 sized and shaped to closely receive and engage with the associated tooth 12. The shapes of the teeth 12 and associated recesses 24 cooperate to ensure that the tooth and socket pairs 34 remain engaged. The recess 24 is formed in an interior of the socket 22 and is defined at least in part by a first wall 26 and a second wall 28 on the interior of the socket 22. The second wall 28 is opposite and spaced from the first wall 26 in the engagement direction and the relative positions of the first wall 26 and second wall 28 of the socket 24 are fixed such that the spacing between the first and second walls 26, 28 does not change during engagement or disengagement of the fastening device, and in particular does not change during any flexure of the first or second fastening members 10, 20. To that end, the first and second walls 26, 28 can be rigidly interconnected, for example by a pair of opposed sidewalls 29 spaced apart parallel to the second axis (Z), which also serve to further define the recess 24. Alternatively, the first and second walls 26, 28 can be rigidly interconnected by a base or top of the socket 22, or other suitable structure. In preferred embodiments, the configuration and all dimensions of the socket, recess and teeth remain unchanged during engagement and disengagement of the fastening device, and during any flexure of the first or second fastening members 10, 20.

The first wall 26 of the socket 22 preferably has a convex profile, complementary to the concave first surface 14 of the tooth, as viewed parallel to the second axis (Z). The convex curve can be on a portion of a first wall 26 or, as depicted, on substantially the entire length of the socket from a proximal end substantially to a distal end. The second wall 28 has a concave profile as viewed in the same direction, complementary to the convex second surface 16 of the tooth, which can be on a portion of a second wall 28 or, as depicted, on substantially the entire length of the socket. Preferably, the curved portions of the first and second walls 26, 28 share a common socket center of curvature which is located adjacent an end of the socket.

The first wall 26 of the socket 22 can have a partially cylindrical convex shape, complementary to the shape of the first surface 14 of the teeth 12, and can have an axis of curvature which is parallel to the second axis (Z) and passes through the socket center of curvature. The second wall 28 of the socket 22 can have a partially cylindrical concave shape, complementary to the second surface 16 of the teeth 12, and can have an axis of curvature in common with that of the first wall 26 of the socket 22.

While FIG. 1A depicts an embodiment wherein substantially the entire lengths of the first wall 26 and second wall 28 are curved, this is not the only arrangement possible under the principles of the claimed technology. For example, the curved portions of the first wall 26 and second wall 28 could be limited to only a section thereof. Other possible embodiments will be ascertainable to those skilled in the art.

The important aspects of the interaction between the tooth 12 and the socket 22 are that they prevent relative movement of the tooth 12 and socket 22 once engaged. For this purpose, it is important that, when the tooth and socket are engaged, the first surface 14 of the tooth closely abuts the first wall 26 of the socket 22 at least at some point, and that the second surface 16 of the tooth closely abuts the second wall of the socket 22 to limit and prevent substantial relative movement of the tooth 12 and socket 22 parallel to the first axis (X).

In addition, it is desirable that, when the tooth 12 and socket 22 are engaged, opposed side surfaces 15, 17 of the tooth, spaced apart parallel to the second axis (Z), closely abut corresponding opposing side walls 29 of the socket to limit relative movement of the tooth 12 and socket 22 parallel to the second axis (Z). The side walls 29 of the socket 22 and the side surfaces 15, 17 of the teeth 12 can be substantially planar and substantially parallel to a plane defined by the first (X) and third (Y) axes. However, a top portion of the side surfaces 15, 17 of the teeth 12 can be tapered inwardly (i.e., toward the opposing side surface) to facilitate insertion of the tooth in the socket.

Figure 10A:
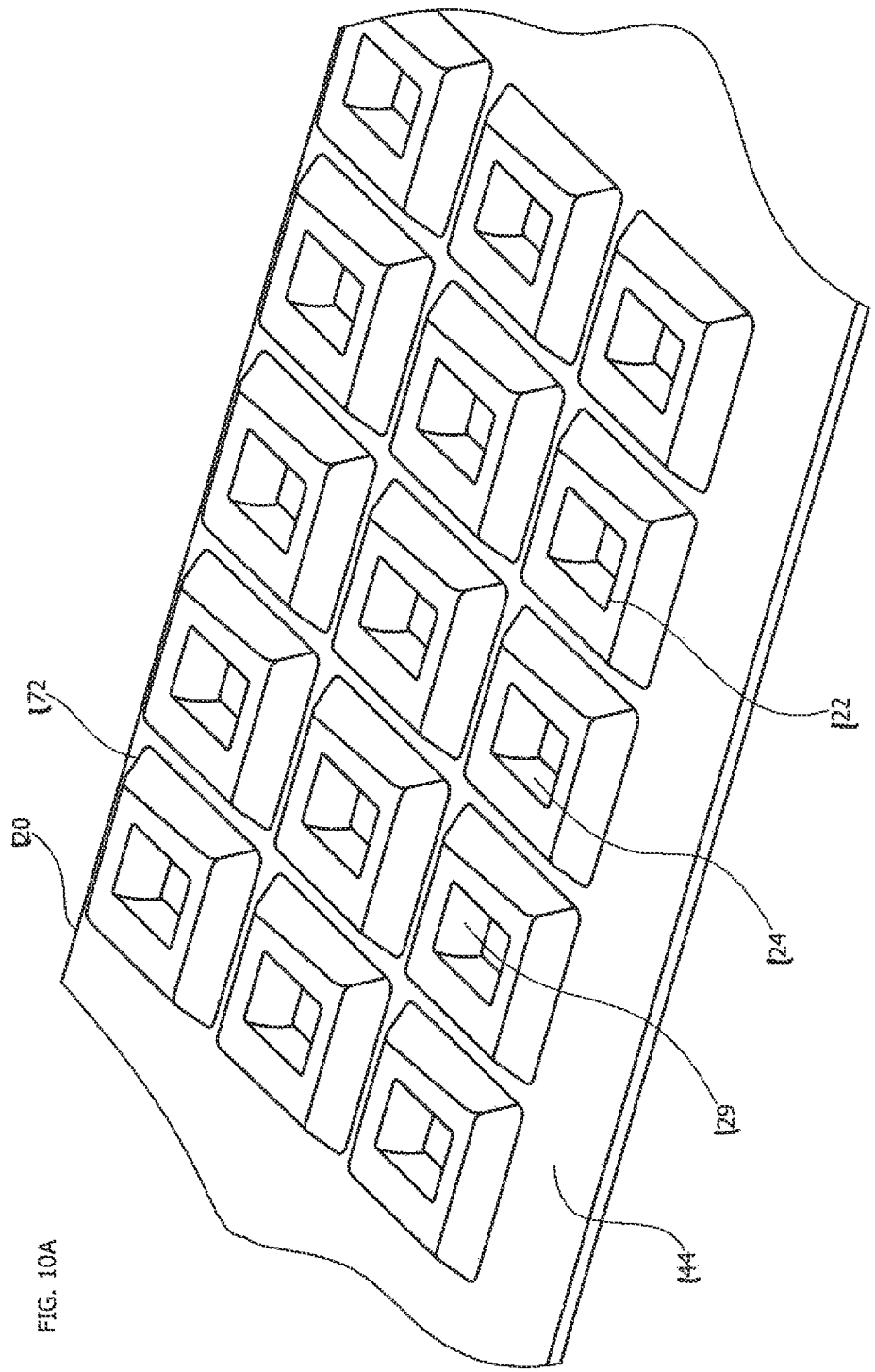
FIG. 10A is an isometric depiction of the second fastening member showing the first opposing surface of the second fastening member and its associated sockets according to aspects of the exemplary embodiment of the claimed technology depicted in FIG. 8A.
Figure 10B:
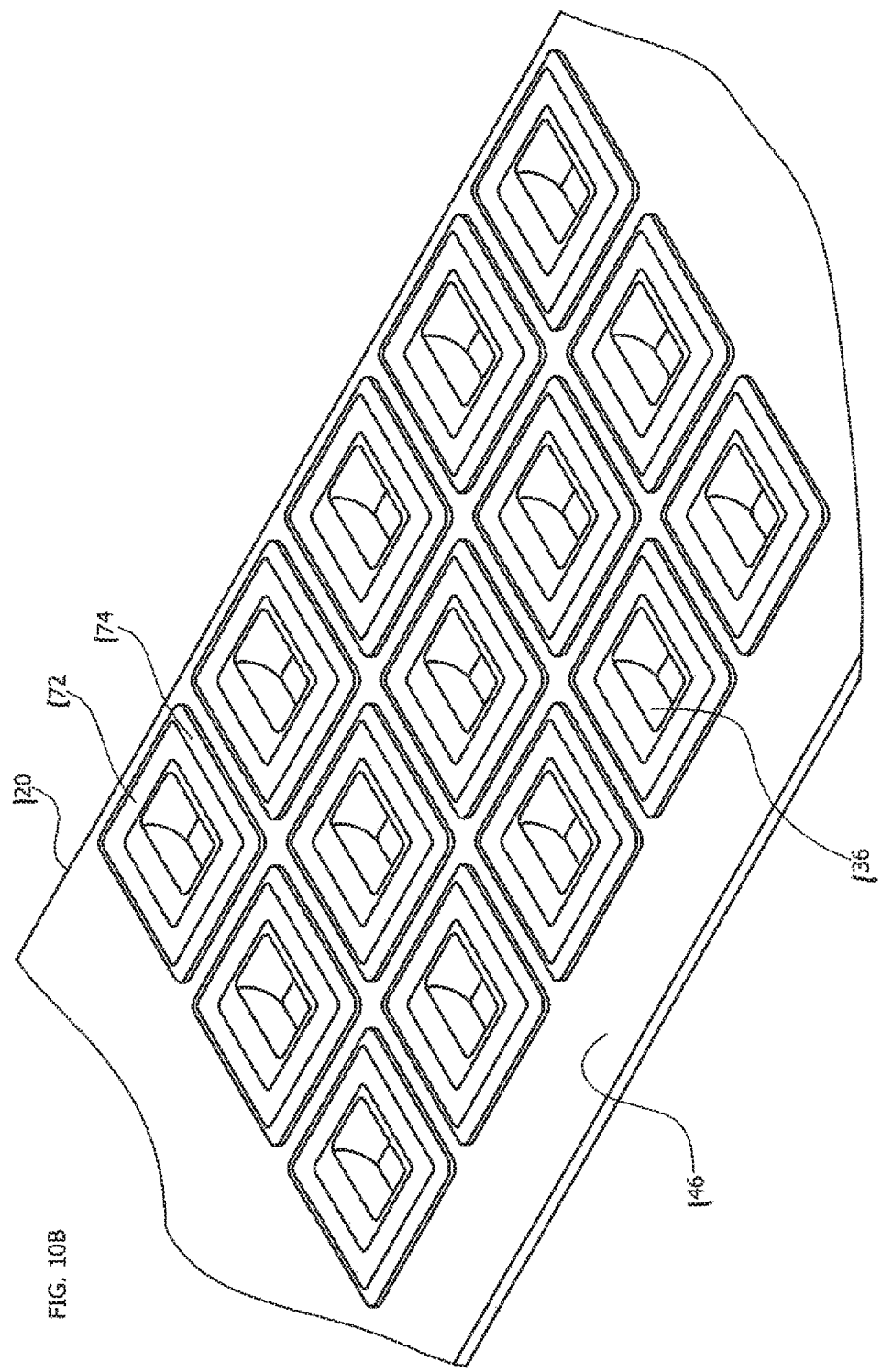
FIG. 10B is an isometric depiction of the second fastening member showing the second opposing surface of the second fastening member according to aspects of the exemplary embodiment of the claimed technology depicted in FIG. 8A.
Figure 13:
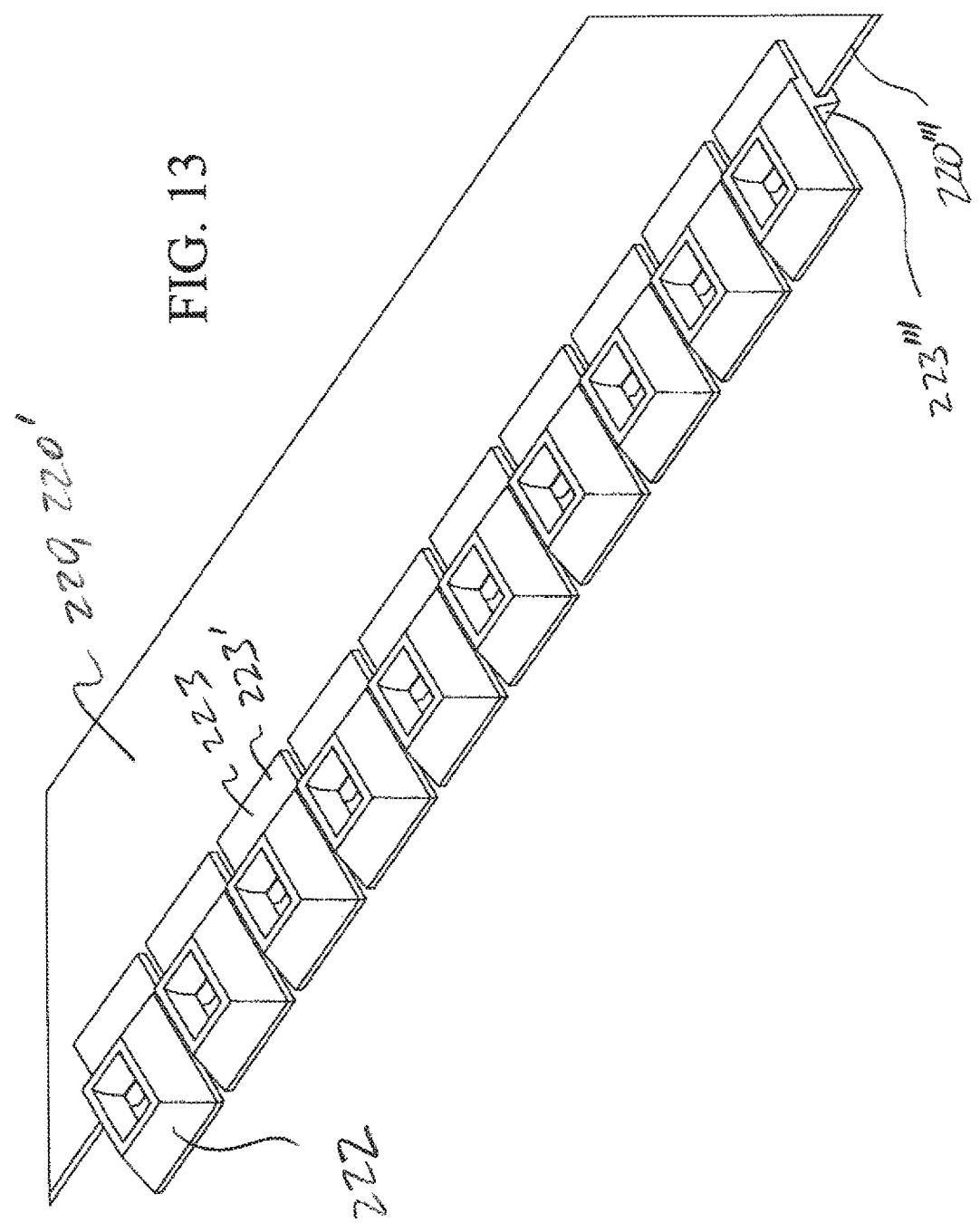
FIGS. 13 and 14 are perspectives view from the top and bottom, respectively, of an embodiment of the invention showing the second fastening member and sockets.
Figure 14:
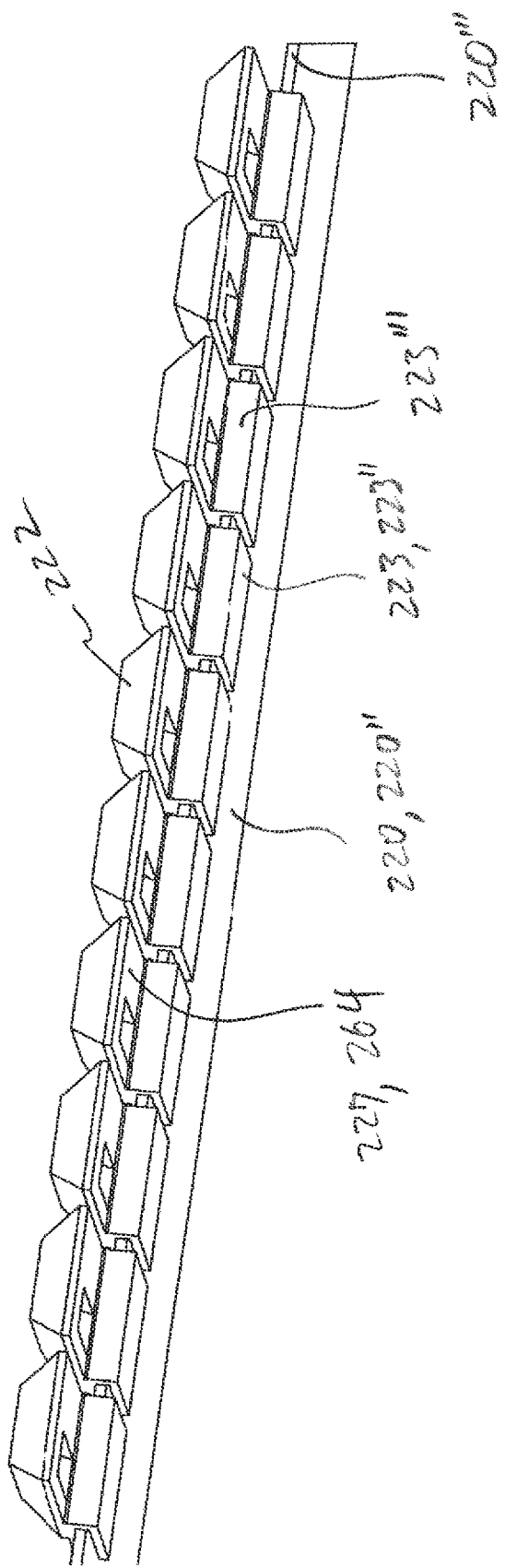

Furthermore, at least some part of the first wall 26 of the socket 22 closely abutting the first surface 14 of the tooth 12 is disposed between the first surface 14 of the tooth 12 and a portion of the first fastening member 10 (i.e., parallel to the third axis (Y)). Preferably, as depicted in FIG. 10, when the tooth and socket are engaged a substantial length of the first wall 26 of the socket 22 closely abuts the first surface 14 of the tooth 12, thereby interposing a substantial portion of the first wall 26 between the first surface 14 and the first fastening member 10. This aspect of the fastening device limits and substantially prevents relative separation movement of the tooth 12 and socket 22 parallel to the third axis (Y) once engaged. However, other configurations of the first surface 14 and first wall 26 are possible that will effectively so limit relative separation movement along the third axis (Y), as will be recognized by those skilled in the art.

The fastening device is adapted to engage the first fastening member 10 with the second fastening member 20 in a singular engagement direction, similar to a zipper. In some embodiments, the fastening device is also adapted to disengage, with such disengagement occurring only in the singular direction opposite to the engagement direction, or the disengagement direction. As depicted in FIGS. 1A-D, the engagement direction proceeds parallel to the first axis (X) (i.e., from left to right as depicted), whereby each tooth and socket pair 34 is engaged sequentially. Engagement occurs through relative rotation of the tooth 12 and socket 22 about a pivot axis area 30. Relative rotational engagement is important given the configuration of the teeth 12 and socket recesses 24, particularly including the requirement that at least a portion of the first wall 26 of the socket 22 is disposed between the first surface 14 of the tooth 12 and the first fastening member 10. In preferable embodiments wherein each of first and second surfaces 14, 16 of the tooth and the first and second wall 26, 28 have substantially the same center of curvature 32 when the tooth 12 and socket 22 are engaged, it is also preferable that the centers of curvature 32 substantially align with the pivot axis area 30. Aligning the pivot axis area 30 with said centers of curvature 32 facilitates smooth engagement of the tooth and socket pairs 34.

In preferable embodiments, both the first fastening member 10 and the second fastening member 20 are comprised of a flexible material. In some embodiments, only one is flexible. In some embodiments, the first and/or second fastening members may be inflexible but employ a plurality of hinges adjacent teeth 12 and adjacent sockets 22. Those skilled in the art will recognize the variety of possible embodiments and arrangements. Whatever material is used for the first and second fastening members, at least one of the teeth 12 or sockets 22 must be capable of rotational movement relative to the other.

Figure 5A:
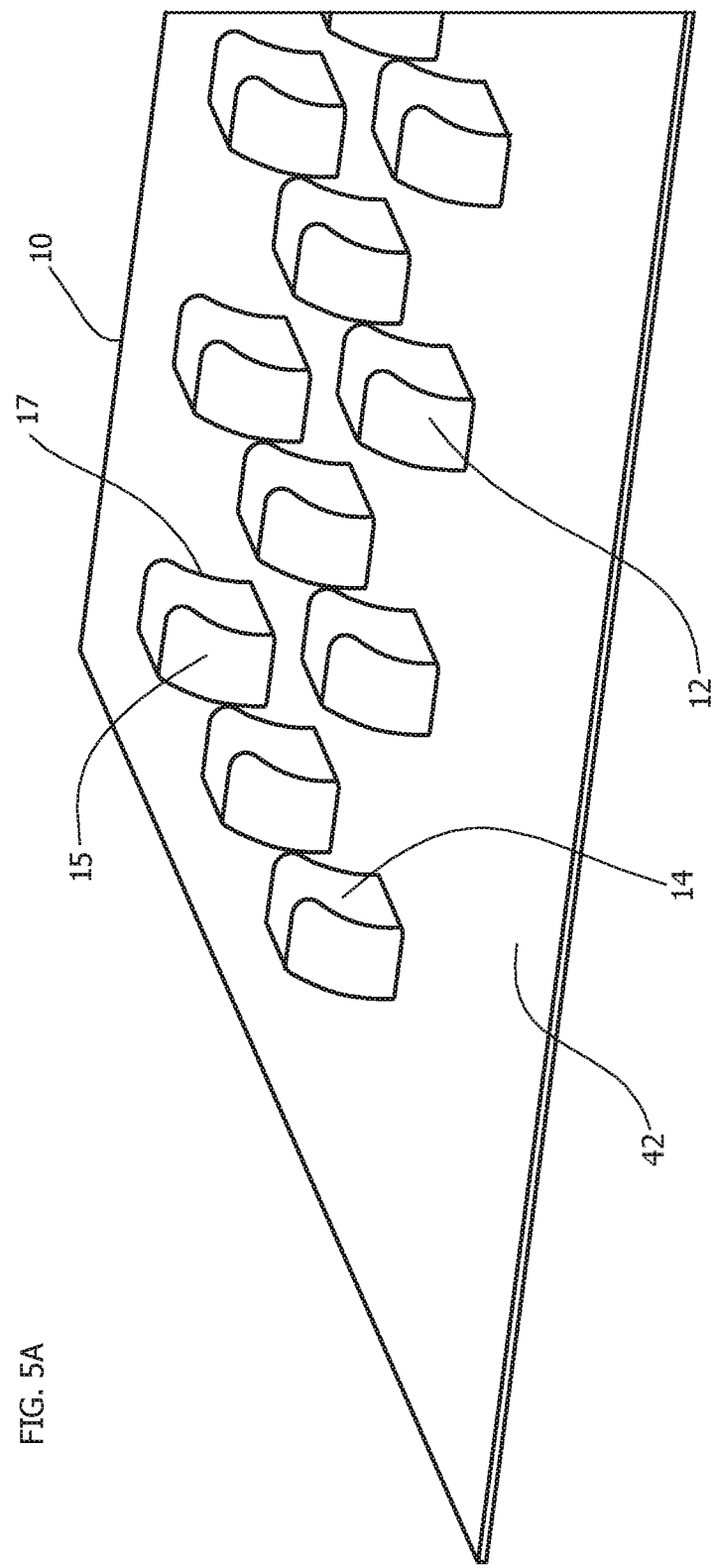
FIG. 5A is an isometric depiction of the first fastening member showing the second opposing surface of the first fastening member and its associated plurality of teeth according to aspects of the exemplary embodiment of the claimed technology depicted in FIG. 1.

Referring to FIGS. 5A and 5B, in a preferable embodiment, both the first fastening member 10 and the second fastening member 20 are formed using a flexible woven on non-woven web-like material. Each fastening member employs a plurality of holes 36 through which the teeth 12 can pass. For example, in some preferable embodiments, the first fastening member 10 has a first opposing surface 40 and a second opposing surface 42 with a plurality of holes 36 therethrough. The plurality of teeth 12 may include a rigid base 18 that extends parallel to the first axis (X) and third axis (Y) and abuts and/or affixes to the first opposing surface 40 of the first fastening member 10. The teeth 12 extend through the holes 36 in the first fastening member 10 and protrude from the second opposing surface 42 opposite the rigid base 18, as depicted in FIGS. 1A and 5A.

Figure 1B:
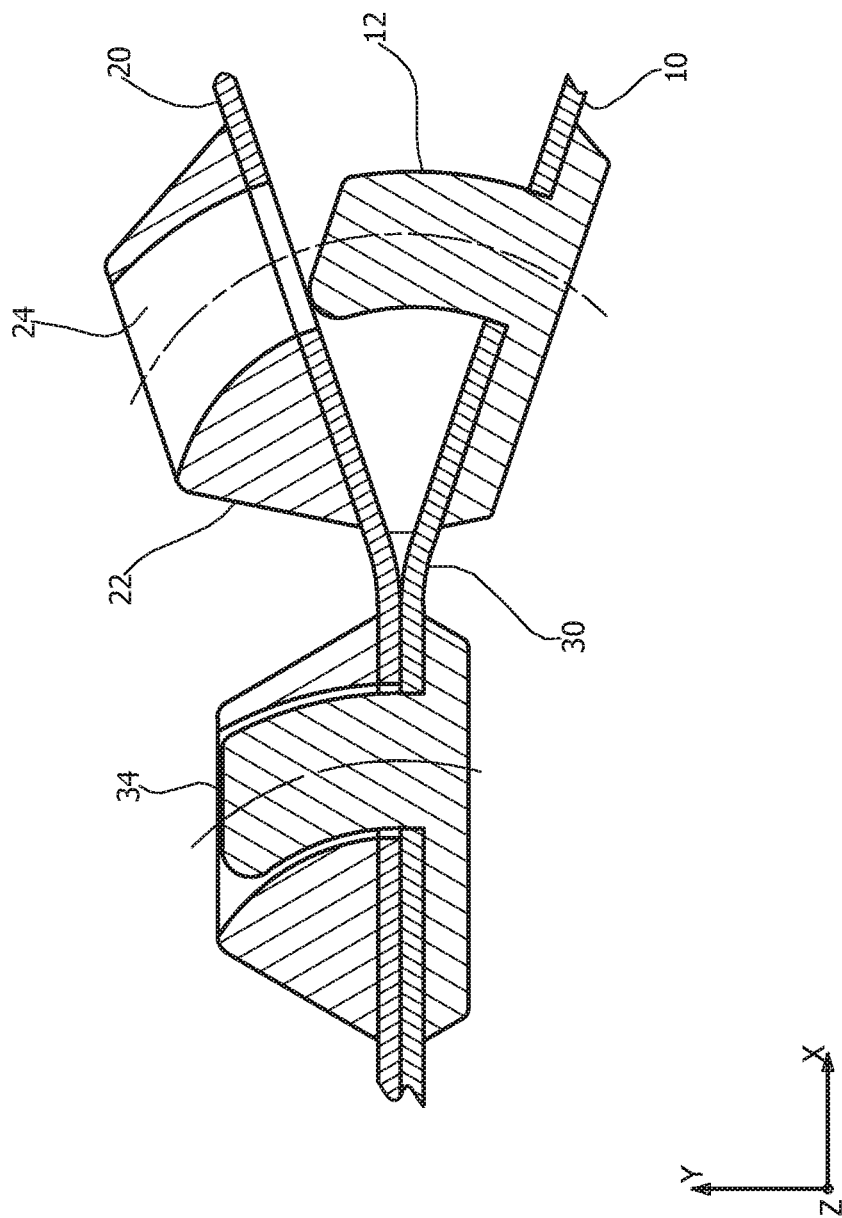
FIG. 1B is a cross-sectional elevation view of the first fastening member and associated plurality of teeth and the second fastening member and associated plurality of sockets showing a first tooth and socket pair in a fully engaged state and a second tooth and socket pair in a disengaged state according to aspects of the exemplary embodiment of the claimed technology depicted in FIG. 1.
Figure 1C:
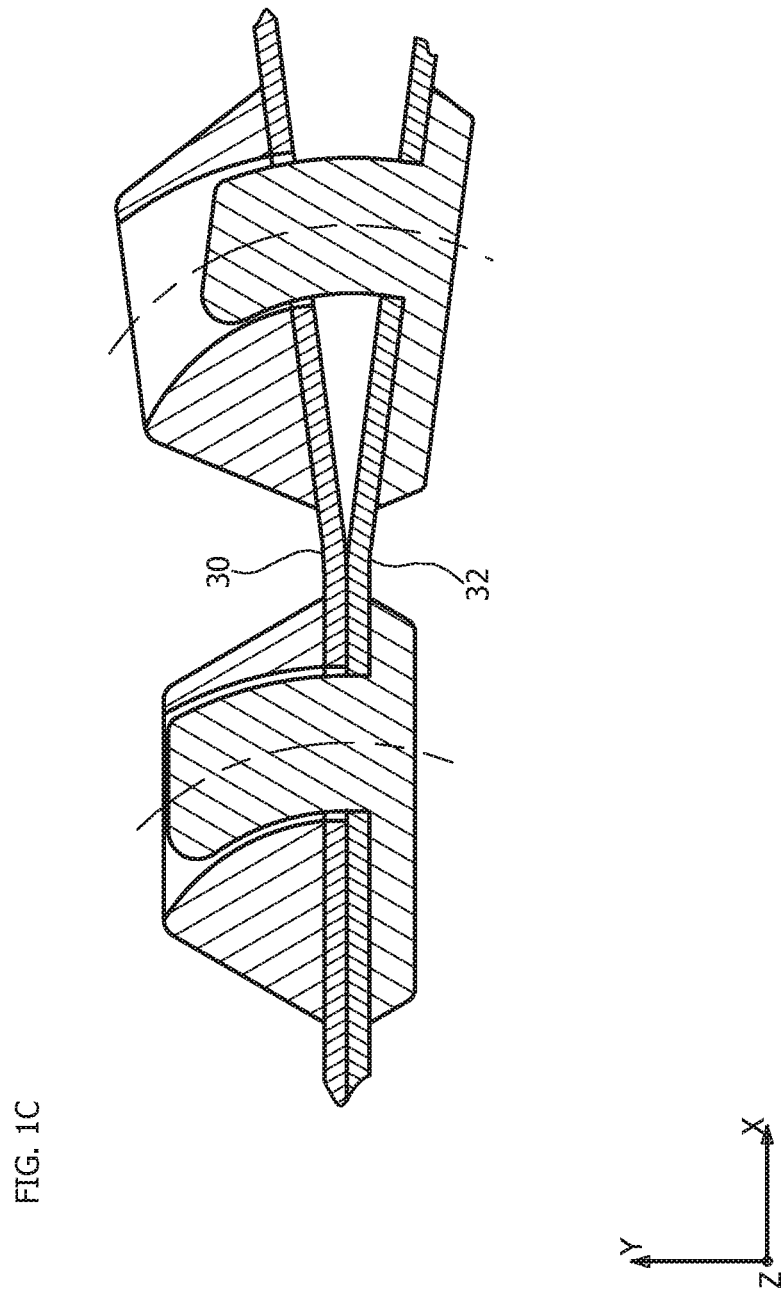
FIG. 1C is a cross-sectional elevation view of the first fastening member and associated plurality of teeth and the second fastening member and associated plurality of sockets showing the first tooth and socket pair in a fully engaged state and a second tooth and socket pair in a partially engaged state according to aspects of the exemplary embodiment of the claimed technology depicted in FIG. 1.
Figure 1D:
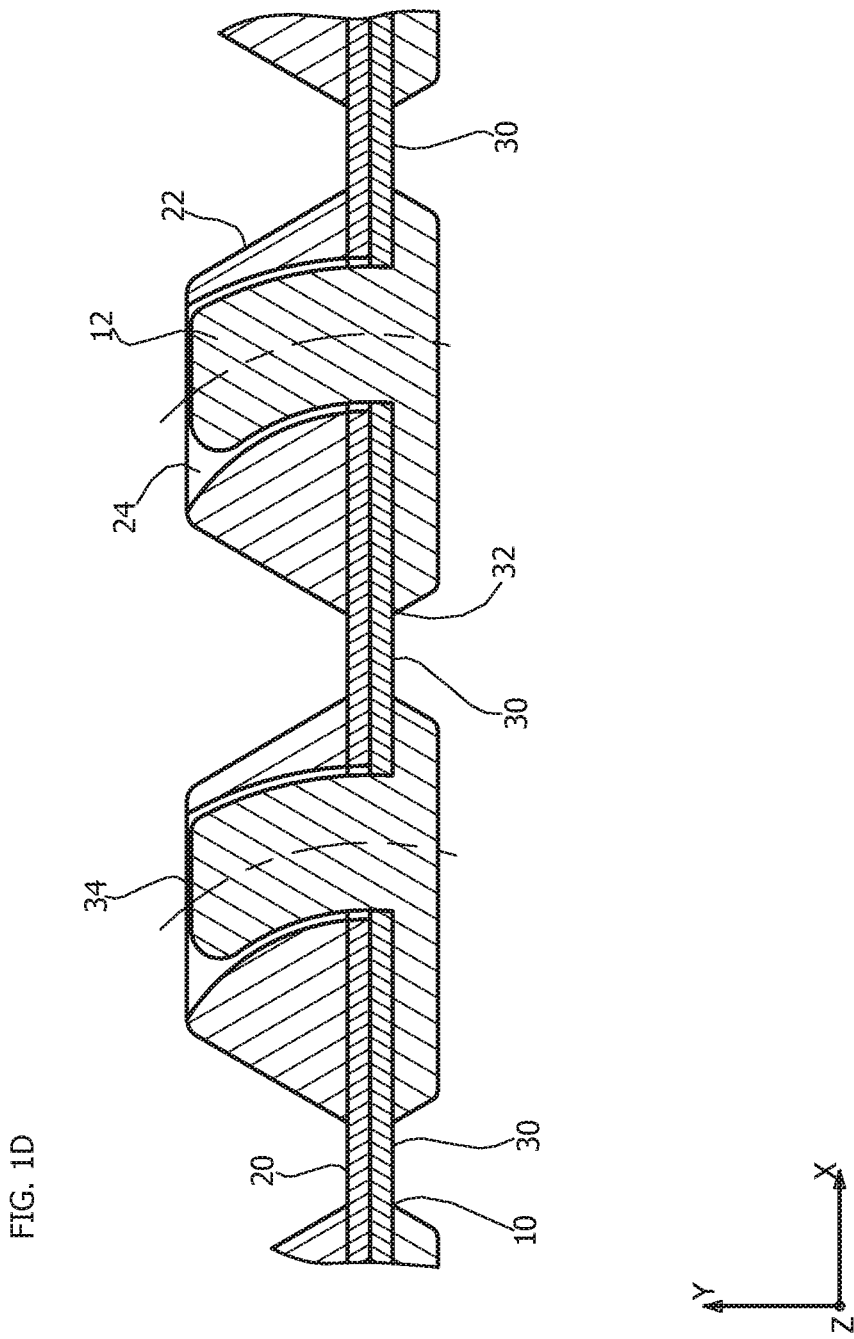
FIG. 1D is a cross-sectional elevation view of the first fastening member and associated plurality of teeth and the second fastening member and associated plurality of sockets showing both the first and second tooth and socket pairs in an engaged state according to aspects of the exemplary embodiment of the claimed technology depicted in FIG. 1.
Figure 6A:
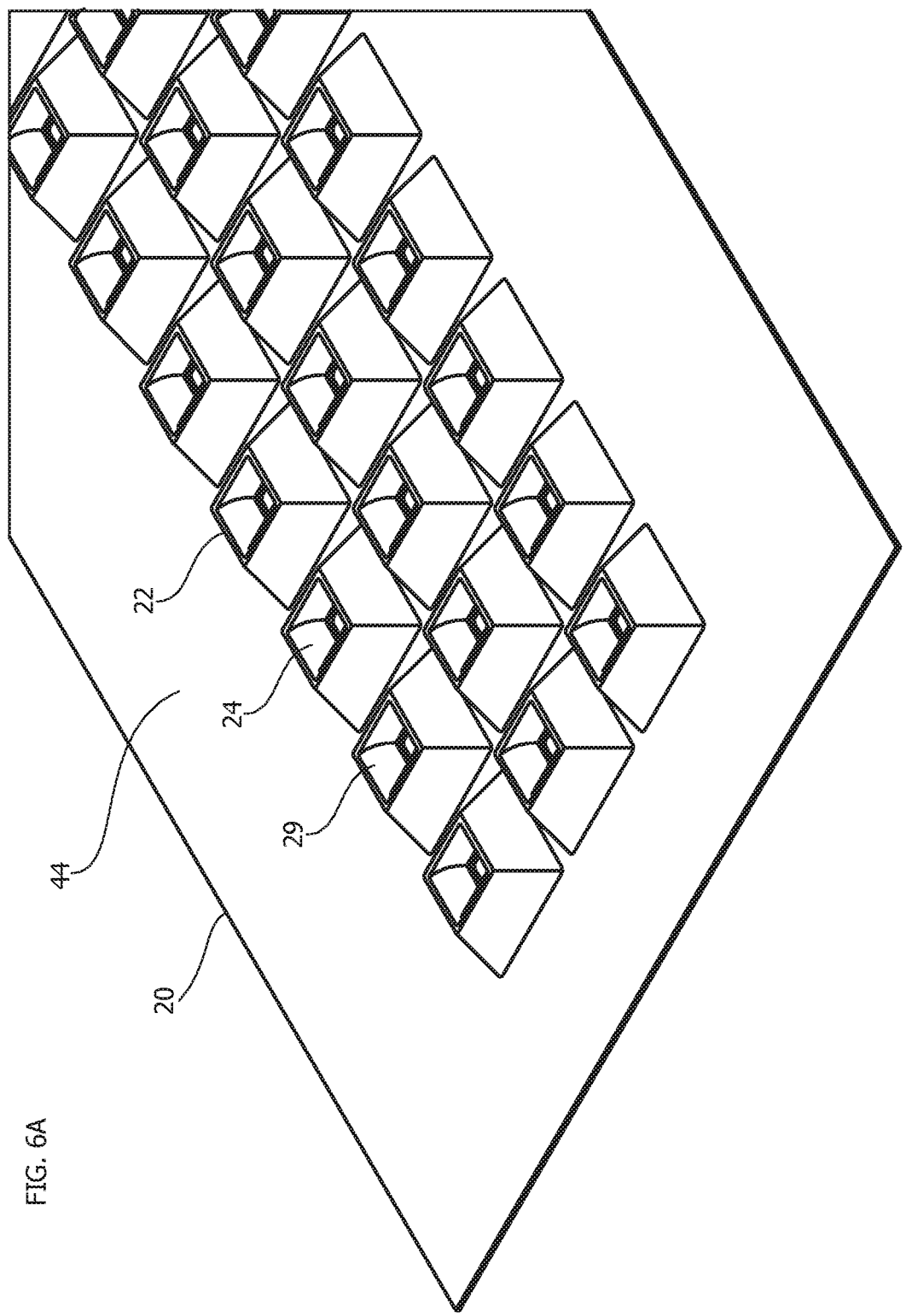
FIG. 6A is an isometric depiction of the second fastening member showing the first opposing surface of the second fastening member and its associated sockets according to aspects of the exemplary embodiment of the claimed technology depicted in FIG. 1.
Figure 6B:
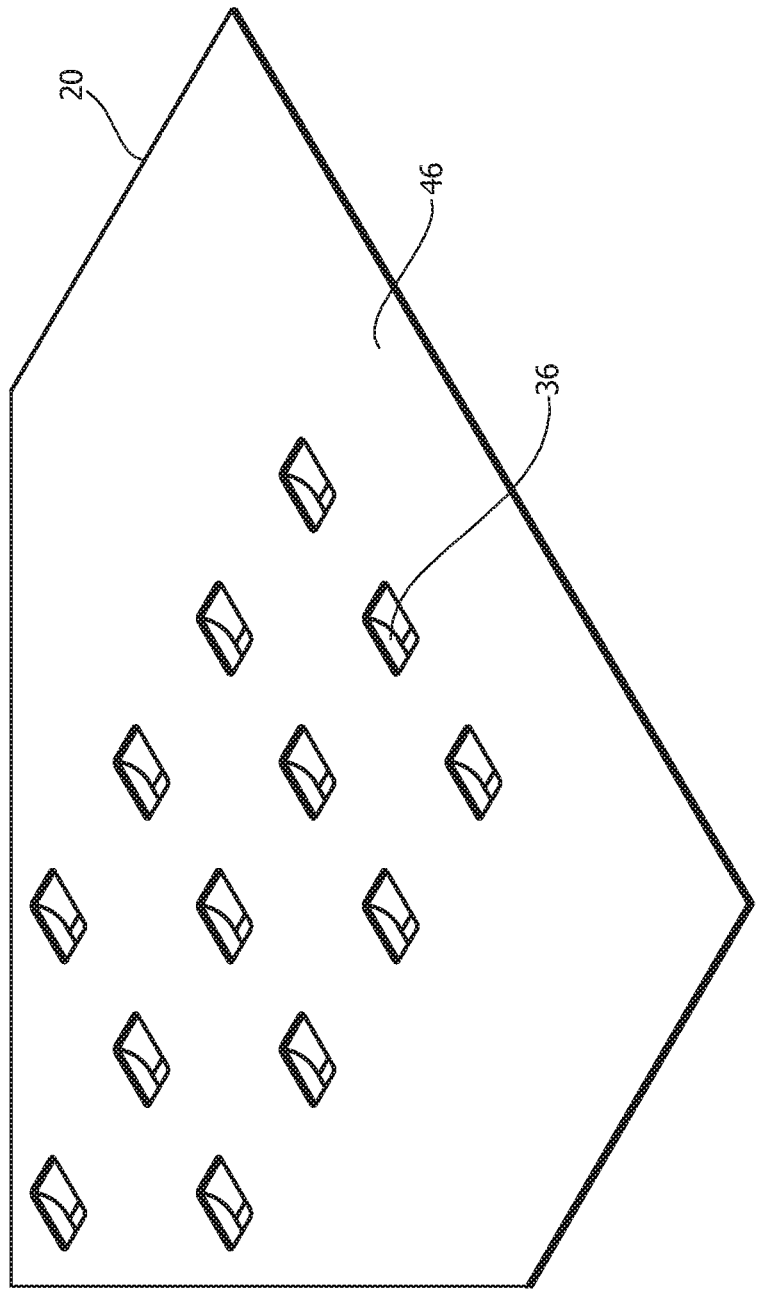
FIG. 6B is an isometric depiction of the second fastening member showing the second opposing surface of the second fastening member with its plurality of holes according to aspects of the exemplary embodiment of the claimed technology depicted in FIG. 1.

Referring to FIGS. 6A and 6B, the second fastening member 20 employs a plurality of holes 36. Like the first fastening member 10, the second fastening member 20 has a first opposing surface 44 and a second opposing surface 46 through which the holes 36 are disposed. Preferably, the sockets 22 abut and/or affix to the first opposing surface 44 of the second fastening member 20 and the socket recesses 24 are substantially aligned with the holes 36 in the second fastening member 20. Thus, the teeth 12 can pass through the holes 36 in the second fastening member 20 and into the socket recesses 24 when the tooth and socket pairs 34 are engaged, thereby engaging the second opposing surface 42 of the first fastening member 10 against the second opposing surface 46 of the second fastening member 20, effectively fastening the first and second fastening members together, as depicted in FIG. 1D. In particularly advantageous embodiments, a gasket or seal of some type may be disposed between the first and second fastening members, creating an airtight and/or watertight seal between the first and second fastening members when the tooth and socket pairs 34 are engaged. Those skilled in the art will recognize the advantages and potential for watertight applications of the present fastening device. Alternatively, an adhesive may be employed between the first and second fastening members, and/or on the surface of the teeth or socket walls, when a permanent engagement is desired.

In the preferable embodiment of the fastening device depicted in FIG. 1A-D, the sockets 22 and teeth 12 (and the bases 18 of the teeth) are composed of rigid material such as plastic, metal etc. Accordingly, the portions of the otherwise flexible first and second fastening members affixed to the sockets 22 and rigid bases 18 are rendered inflexible. Preferably, the remaining portions of the first and second fastening members remain flexible, particular the portions in the pivot axis areas 30 between adjacent rows of teeth/sockets and the areas between adjacent columns. Gaps between bases 18 of adjacent teeth 12 are aligned with gaps between adjacent sockets 22 such that the area of flexibility of the first and second fastening members are aligned.

Other embodiments may use rigid first and second fastening members employing hinges in the pivot axis areas 30. Whether flexible or inflexible material is used for the first and second fastening members, the technology requires relative rotational movement between the teeth 12 and sockets 22 about the pivot axis area 30 to engage and, in some embodiments, also disengage. The relative rotational movement is preferably accomplished using flexible materials or hinges on both the first and second fastening members, as depicted in FIGS. 1B and 10. However, as those skilled in the art will recognize, the necessary relative rotational movement may also be accomplished by employing flexible material or hinges on only one or the other of the first and second fastening members or by some combination of the same, such as a flexible first fastening member 10 and hinges on an otherwise rigid second fastening member 20.

As depicted in FIG. 2, the tooth and socket pairs 34, 34', 34" are engaged sequentially in the engagement direction parallel to the first axis (X). The engagement of a tooth and socket pair 34 has the effect of limiting or preventing relative movement of the tooth and socket pair 34 immediately preceding the engaged tooth and socket pair 34 in the engagement direction. Using FIG. 2 as a reference, engagement of the second tooth and socket pair 34' (i.e., the center tooth and socket pair depicted) effectively locks the preceding first tooth and socket pair 34 (i.e., the left-most tooth and socket pair depicted) in the engaged state by preventing relative rotational movement of the first tooth 12 and socket 22. Particularly, the configuration of the first tooth 12 and socket recess 24 cooperate to preclude relative movement at least parallel to the first axis (X) or third axis (Y), and the engagement of the second tooth and socket pair 34 precludes any relative rotational movement. Accordingly, the first tooth and socket pair 34 depicted is effectively locked in the engaged state unless and until the second tooth and socket pair 34' is disengaged.

The engagement of a tooth and socket pair 34 also has the effect of limiting the relative movement of the tooth and socket pair 34 immediately succeeding the engaged tooth and socket pair 34 in the engagement direction. Again using FIG. 2 as a reference, the engagement of the second tooth and socket pair 34' (center pair depicted) substantially limits the relative movement of the succeeding third tooth and socket pair 34" (i.e., the right-most pair depicted) in all manner other than the relative rotational movement necessary to engage the third tooth and socket pair 34. The limitation to the relative movement of the third tooth 12 and socket 22 is due to the limited length of the flexible portion of the first and second fastening members in the pivot axis area 30. Because the length of the first and second fastening members in the pivot axis area 30 parallel to the first axis (X) is significantly shorter than the length of the portion of the first and second fastening members affixed to the rigid teeth 12 and sockets 22, the third tooth 12 and socket 22 are substantially limited to one degree of freedom of relative movement, that being relative rotation about a pivot axis parallel to the second axis (Z) preferably passing through or between the first and second fastening members in the pivot axis area 30. A close-up of the pivot axis area is depicted in FIG. 2A.

FIG. 2A also depicts the preferable location of the center of curvature for one or more of the curved portions of the first and second surfaces 14, 16 of the tooth and the first and second wall 26, 28 of socket 22. In preferable embodiments, during engagement all four features will share a common center of curvature 32. As depicted in FIG. 2A, the common center of curvature 32 is disposed within the pivot axis area 30 in preferable embodiments. In the preferable embodiment depicted in FIG. 2A, the center of curvature 32 is located adjacent to the end of the pivot axis area 30 closest to the associated tooth and socket pair 34. Those skilled in the art will recognize other arrangements that would satisfy the requirements of the present technology as well.

Referring back to FIG. 2, in preferable embodiments wherein the first surface 14 and second surface 16 of the tooth 12 share a common center of curvature 32, the line labeled "B-B" is on the radius of curvature of such surfaces (or an extension thereof). In such embodiments, the cross-sectional thickness of the tooth, as measured along the line labeled "B-B," is constant, at least for a portion of the length of the tooth. Accordingly, a center arc 38 of the tooth 12 can be identified with a center of curvature 32 at the same position as that of the first and second surfaces 14, 16 of the tooth 12 and with a radius of curvature halfway between the radii of curvature of first and second surfaces 14, 16.

Furthermore, in preferable embodiments wherein the first surface 14 and second surface 16 of the tooth 12 share a common center of curvature 32, the shape of the cross-section of the tooth remains constant, at least over a portion of the length of the tooth, such that the tooth has the form of a solid of revolution over such portion. In such embodiments, a cross-sectional plane is defined by the radius of curvature of the first and second surfaces 14, 16 (i.e., along line B-B) and the second axis (Z), and the cross-section of the tooth defined by such a plane preferably has a constant shape along a substantial portion of the length of the tooth 12. In other words, in embodiments wherein the first and second surfaces 14 and 16 share a common center of curvature 32, the cross-section of the tooth 12 taken on such a cross-sectional plane will remain constant over at least a portion of the tooth's 12 length, and preferably over a substantial portion. The cross-sectional shape can take any number of shapes. FIG. 2B provides a list of several alternative cross-sectional shapes. The list is not intended to be limiting, as those skilled in the art will recognize that nearly any shape is possible while still accomplishing the objectives of the present technology.

Likewise, in preferred embodiments the cross-sectional width and shape of the recess 24 is preferably constant over a substantial portion of the length of the recess 24 as measured or taken in the manner described above with respect to the corresponding dimensions of the tooth 12 such that the recess has the form of a volume of revolution over such portion. Specifically, the cross-sectional thickness of the recess, as measured along the line labeled "B-B," can be constant, at least for a portion of the length of the recess. Also, a shape of a cross-section of the recess, taken on a plane defined by the radius of curvature of the first and second walls 26, 28 and the second axis (Z) (i.e., along line B-B) preferably has a constant shape along a substantial portion of the length of the recess 24. As with the tooth, the cross-section of the recess can take any number of shapes, such as those depicted in FIG. 2B, and other suitable shapes.

Many alternatives are available for the cross-sectional shape of the teeth 12 (and associated socket 22), as depicted in FIG. 2B. The specific shape of each tooth 12 is less important so long as the tooth 12 and recess 24 are adapted to retain the first and second fastening members 10 and 20 abutting one another.

Figure 3:
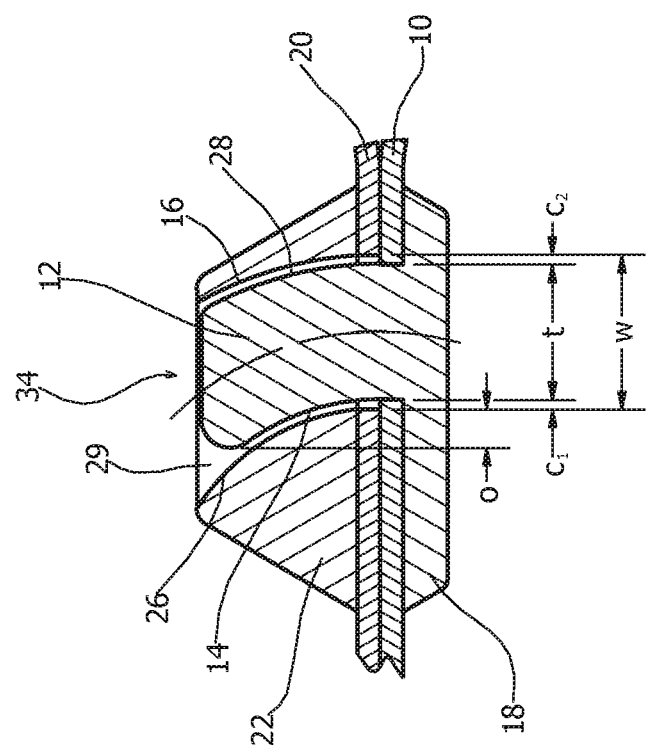
FIG. 3 is a cross-sectional elevation view of a tooth and socket pair in an engaged state according to aspects of the exemplary embodiment of the claimed technology depicted in FIG. 1.

Referring to FIG. 3, regardless of the cross-sectional shape of the teeth 12 and socket recesses 24, the present technology is effective for its intended purposes so long as the geometry of the teeth 12 and socket recesses 24 effectively limit the relative movement of the tooth 12 and socket 22 when in the engaged position. To that end, preferable arrangements and measurements are depicted in FIG. 3. While the arrangements and measurements depicted in FIG. 3 are preferable, those skilled in the art will understand that many variations are also possible.

As noted, the cross-sectional thickness ("t") of the tooth 12 taken parallel to a radius of curvature is constant over a substantial length of the tooth 12 in preferable embodiments wherein a substantial length of the tooth's first and second surfaces 14 and 16 are curved and share a common center of curvature 32. Similarly, the width ("w") of the socket recess 24 measured parallel to a radius of curvature is constant over a substantial length of the recess in preferable embodiments wherein a substantial length of the first and second walls 26, 28 of the socket 22 are curved and share a common center of curvature 32. Also, a depth of the tooth 12 as measured parallel to the second axis (Z) can be substantially constant over a substantial length of the tooth and, similarly, a depth of the recess 24 as measured parallel to the second axis (Z) can be substantially constant over a substantial length of the recess.

While it is preferable that the thickness ("t") of the tooth and the width ("w") of the recess are close to equal, practicably there is a small gap or clearance ("c") on each side of the tooth 12 measured parallel to the radii of curvature of the tooth and recess, represented in FIG. 3 by measurements "$c_1$" and "$c_2$." Preferably, the distances "$c_1$" and "$c_2$" will not exceed 7.5 percent of the thickness ("t") of the tooth 12, substantially limiting the relative movement of the tooth 12 and socket 22 in either the engagement or disengagement direction parallel to the first axis (X). Likewise, there can be a similar small gap/clearance between each side surface 15, 17 of the tooth 12 and the adjacent side wall 29 of the socket 22, measured parallel to the second axis (Z).

Furthermore, at least some portion of the tooth 12 closely abutting the first wall 24 of the socket 22 has an overlap ("o") of at least a part of the first wall 26 of the socket 22. The overlap "o" is greater than zero and is preferably at least 20 percent of the thickness ("t") of the tooth 12. The overlap "o" substantially prevents relative separation movement of the tooth 12 and socket 22 parallel to the third axis (Y). The combination of the tight clearance "$c_1$" and "$c_2$" and the overlap "o" substantially limits the relative movement of the teeth 12 and sockets 22 parallel to the first (X) and third (Y) axes, and the similar tight gap/clearance between each side surface 15, 17 and the adjacent side wall 29 of the socket substantially limits relative movement parallel to the second axis (Z). The features, arrangements, and measurements depicted in FIG. 3 represent a preferable embodiment only, and the present technology is not limited thereby.

FIG. 4A depicts a cross-sectional profile of one of the teeth 12 as viewed parallel to the second axis (Z), separate and apart from the first fastening member 10. As depicted, the tooth 12 has a first surface 14 and a second surface 16, and in some preferable embodiments also employs a rigid base 18 extending horizontally along the first axis (X) and the second axis (Z). The tooth's rigid base 18 is preferably affixed to the first opposing surface 40 of the first fastening member 10.

Figure 4C:
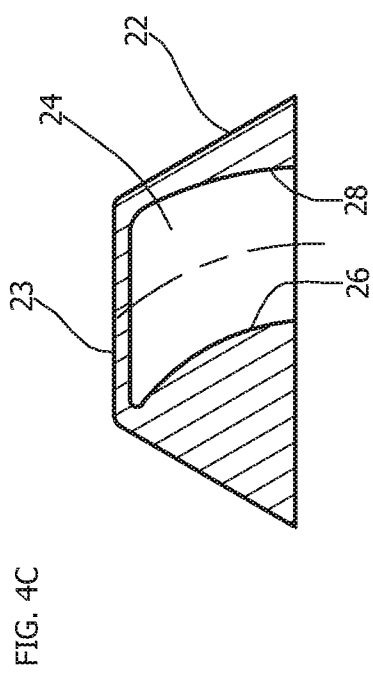
FIG. 4C is a cross-sectional view of a socket according to aspects of an embodiment of the claimed technology.

FIG. 4B depicts a cross-sectional profile of one of the sockets 22 as viewed parallel to the second axis (Z), separate and apart from the second fastening member 20. As depicted the socket 22 has an internal recess 24 defined at least in part by a first wall 26 and a second wall 28. In some embodiments, the recess 24 extends the entire height of the socket 22, creating a hole in an open top of the socket 22. However, preferably when the tooth is fully engaged with (and maximally received within) the socket, the distal end of the tooth (i.e., top or free end) is within the socket 22 and/or below or flush/co-planar with a top of the socket 22 so that pressure or force applied to the top of the socket does not tend to dislodge the tooth from the socket. In other embodiments, such as that depicted in FIG. 4C, the recess 24 is further defined by and terminates at a closed top 23 of the socket 22.

FIG. 5A provides an isometric view of the first fastening member 10 showing the second opposing surface 42 of the first fastening member 10. As depicted, the plurality of teeth 12 protrude from the second opposing surface 42 of the first fastening member 10. The teeth 12 can be arranged in rows and columns adapted to sequentially engage with the plurality of sockets 22 affixed to the second fastening member.

FIG. 5B provides an isometric view of the first fastening member showing the first opposing surface 40 of the first fastening member 10. As depicted, preferable embodiments of the present technology employ teeth 12 with rigid bases 18. The rigid bases 18 are preferably affixed to the first opposing surface 40 of the first fastening member 10. Thereby, as the first fastening member 10 is manipulated by the user, the plurality of teeth 12 move therewith. Each base 18 can have a partial pyramidal shape (i.e., a pyramidal frustum) which tapers away from the first opposing surface 40 of the first fastening member 10. More specifically, the base 18 can be a truncated square pyramid shape such that the base 18 has a trapezoidal profile or cross-section (as viewed parallel to the first axis (X) or second axis (Z)).

FIG. 6A provides an isometric view of the second fastening member showing the first opposing surface 44 of the second fastening member 20. As depicted, the plurality of sockets 22 are preferably affixed to the first opposing surface 44 of the second fastening member 20 such that, when the second fastening member 20 is manipulated by the user, the plurality of sockets 22 move therewith. Each socket 22 can have an exterior with partial pyramidal shape (i.e., a pyramidal frustum) which tapers away from the first opposing surface 44 of the second fastening member 20. More specifically, the socket 22 can be a truncated square pyramid shape such that the exterior of the socket 22 has a trapezoidal profile or cross-section (as viewed parallel to the first axis or second axis (Z)).

FIG. 6B provides an isometric view of the second fastening member showing the second opposing surface 46 of the second fastening member 20. As depicted, the second fastening member 20 is provided a plurality of holes 36. In preferable embodiments of the technology, the socket recesses 24 substantially align with the holes 36, as depicted, and the plurality of teeth 12 affixed to the first fastening member 10 pass through the holes 36 and into the socket recesses 24, thereby engaging with the sockets 22. Thus, when the tooth and socket pairs 34 are in the engaged state, the second opposing surface 42 of the first fastening member 10 and the second opposing surface 46 of the second fastening member 20 abut one another. In some embodiments, a gasket or seal, preferably a compressible elastomeric seal, may be disposed between the second opposing surface 42 of the first fastening member 10 and the second opposing surface 46 of the second fastening member 20, thereby creating an airtight and/or watertight application of the present technology.

In each of FIGS. 5A, 5B, 6A, and 6B, the first and second fastening members employ several rows and several columns of teeth 12 and sockets 22, respectively. While a single tooth and socket pair 34 may be sufficient in some instances to hold the first and second fastening members together—for example if the tooth and socket pair is adapted to prevent disengagement—it is preferable to employ a plurality of teeth 12 and sockets 22 arranged in at least one column. In such preferable embodiments, each tooth and socket pair 34 is locked in the engaged state upon engagement of the next sequential tooth and socket pair 34 following the first in the engagement direction. In some instances, it may also be advantageous to arrange the plurality of teeth 12 and sockets 22 in two or more columns, creating a plurality of rows of teeth 12 and sockets 22, as depicted in FIGS. 5A, 5B, 6A, and 6B. Employing two or more columns may help to facilitate engagement of the tooth and socket pairs 34, as engagement of a first row will substantially limit the relative movement of succeeding rows. In such arrangements, it is preferable that the number of rows exceeds the number of columns and that the tooth and socket pairs are arranged in a regularly spaced rectangular array, though other arrangements are equally possible. Where the tooth and socket pairs are arranged in a array having columns aligned in the engagement direction (i.e., parallel to the first axis (X)) and equally-spaced rows extending parallel to the second axis (Z), the tooth and socket pairs in each column will engage and disengage sequentially and the tooth and socket pairs in each row will engage and disengage substantially simultaneously.

Figure 7A:
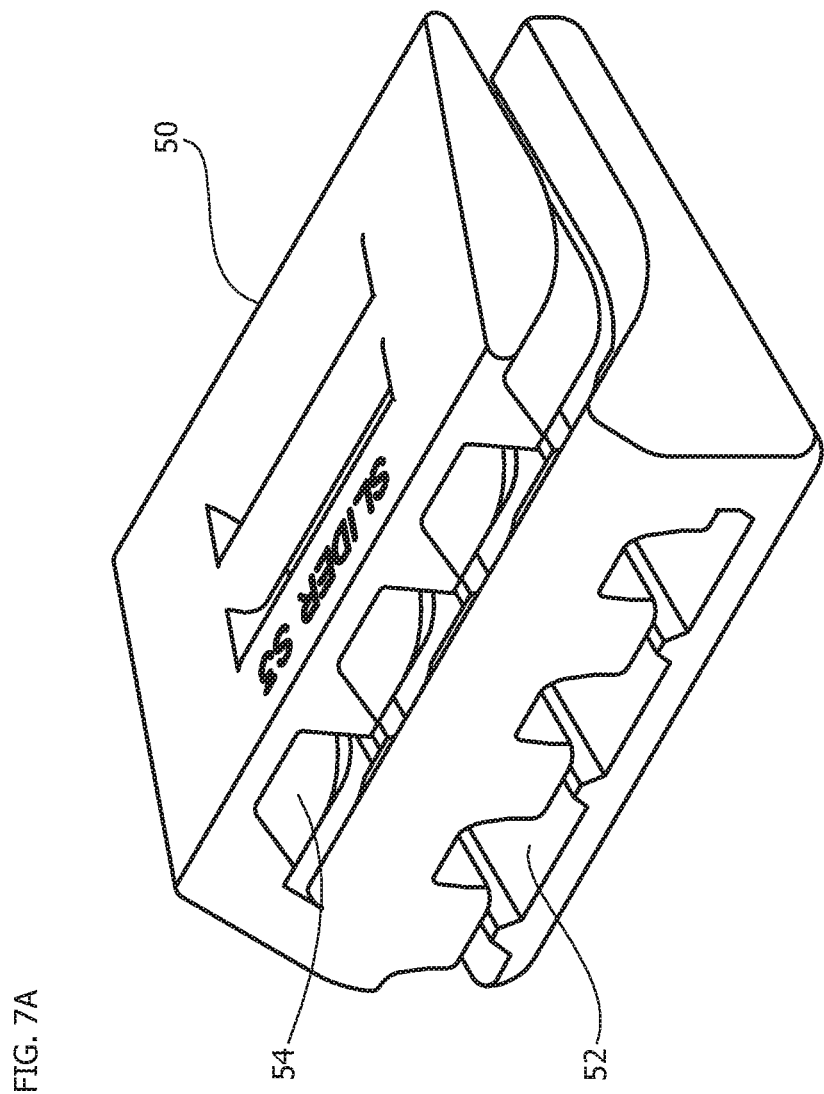
FIG. 7A is an isometric depiction of the slider according to aspects of the exemplary embodiment of the claimed technology depicted in FIG. 1.
Figure 7B:
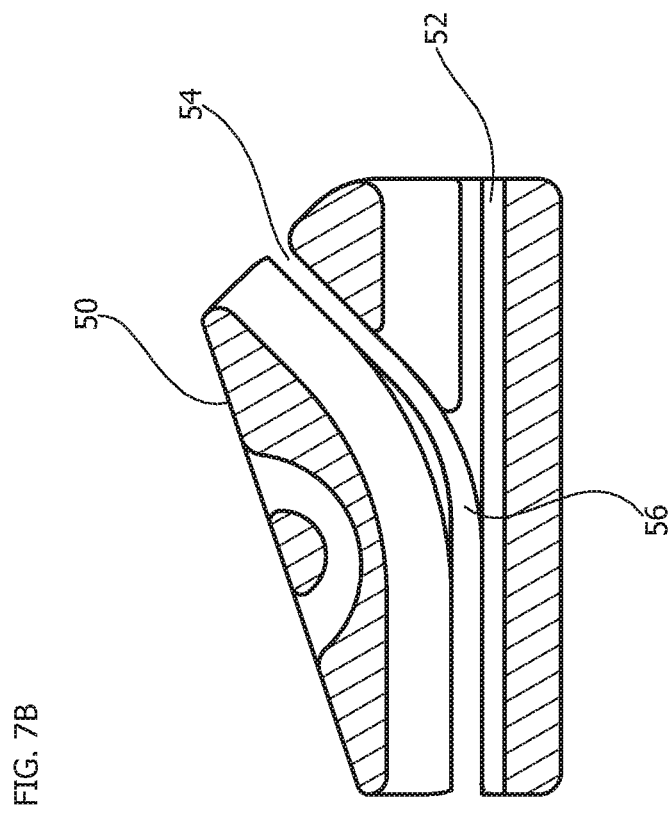
FIG. 7B is a depiction of the cross-sectional profile of the slider according to aspects of the exemplary embodiment of the claimed technology depicted in FIG. 1.
Figure 8A:
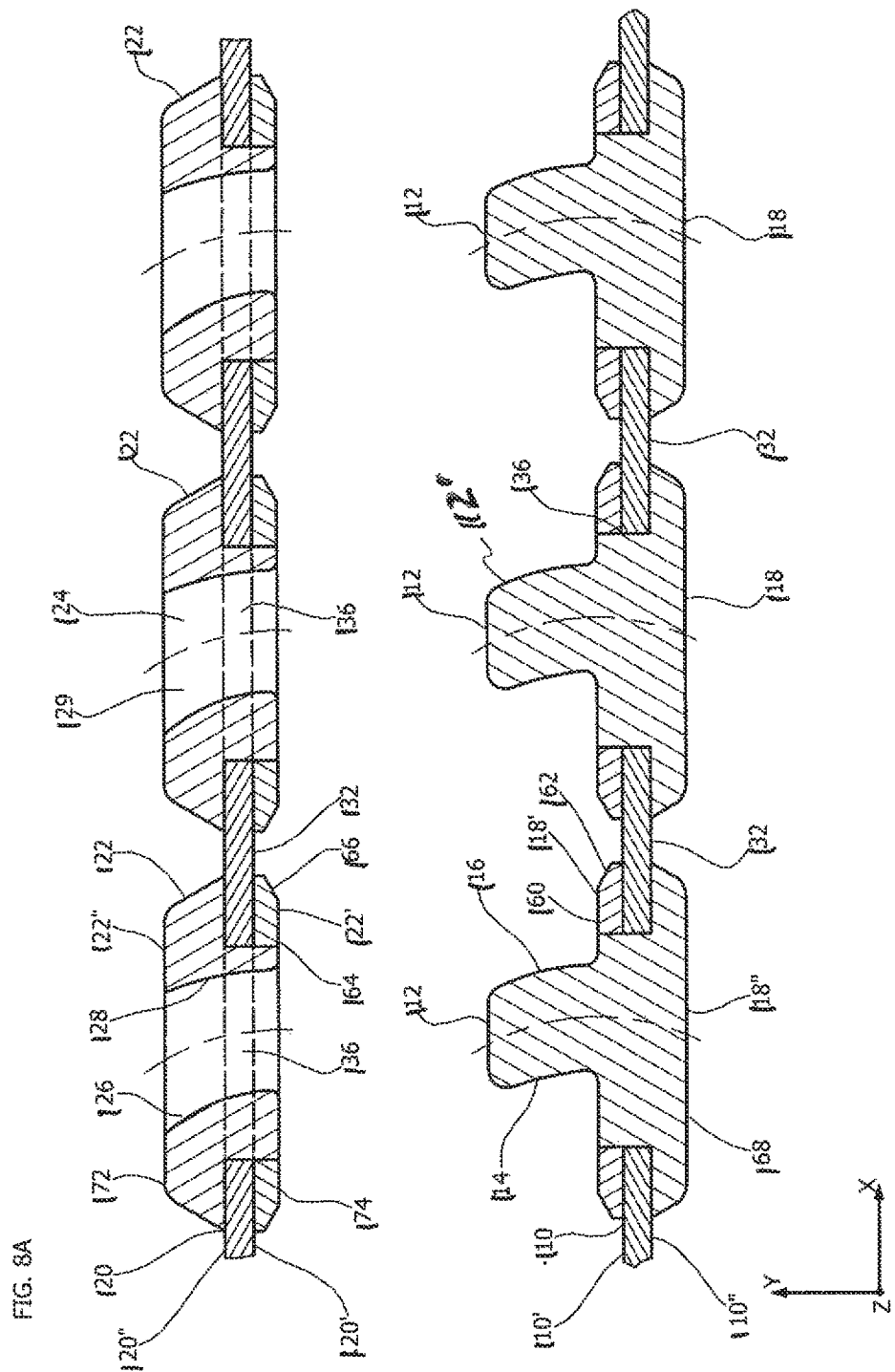
FIG. 8A is a cross-sectional elevation view of the first fastening member and associated plurality of teeth and the second fastening member and associated plurality of sockets showing profiles of the teeth and recesses, according to an embodiment of the claimed technology.
Figure 9A:
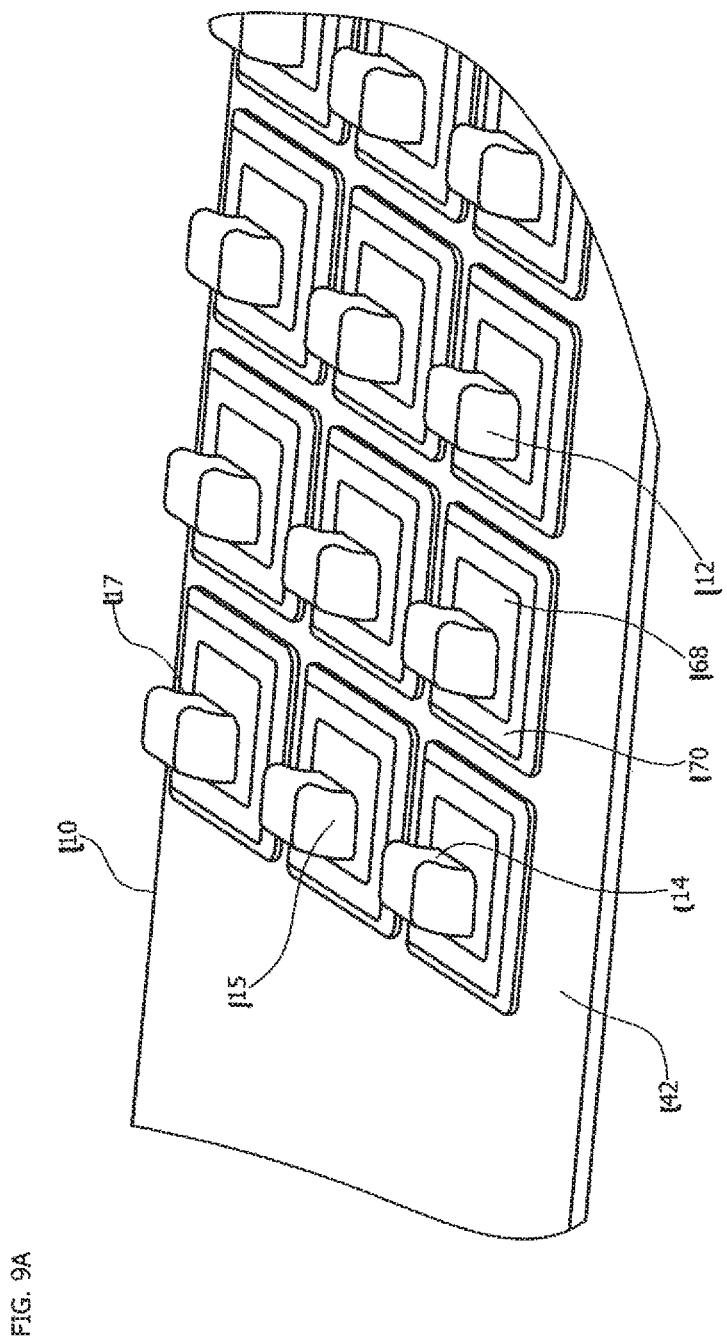
FIG. 9A is an isometric depiction of the first fastening member showing the second opposing surface of the first fastening member and its associated plurality of teeth according to aspects of the exemplary embodiment of the claimed technology depicted in FIG. 8A.
Figure 9B:
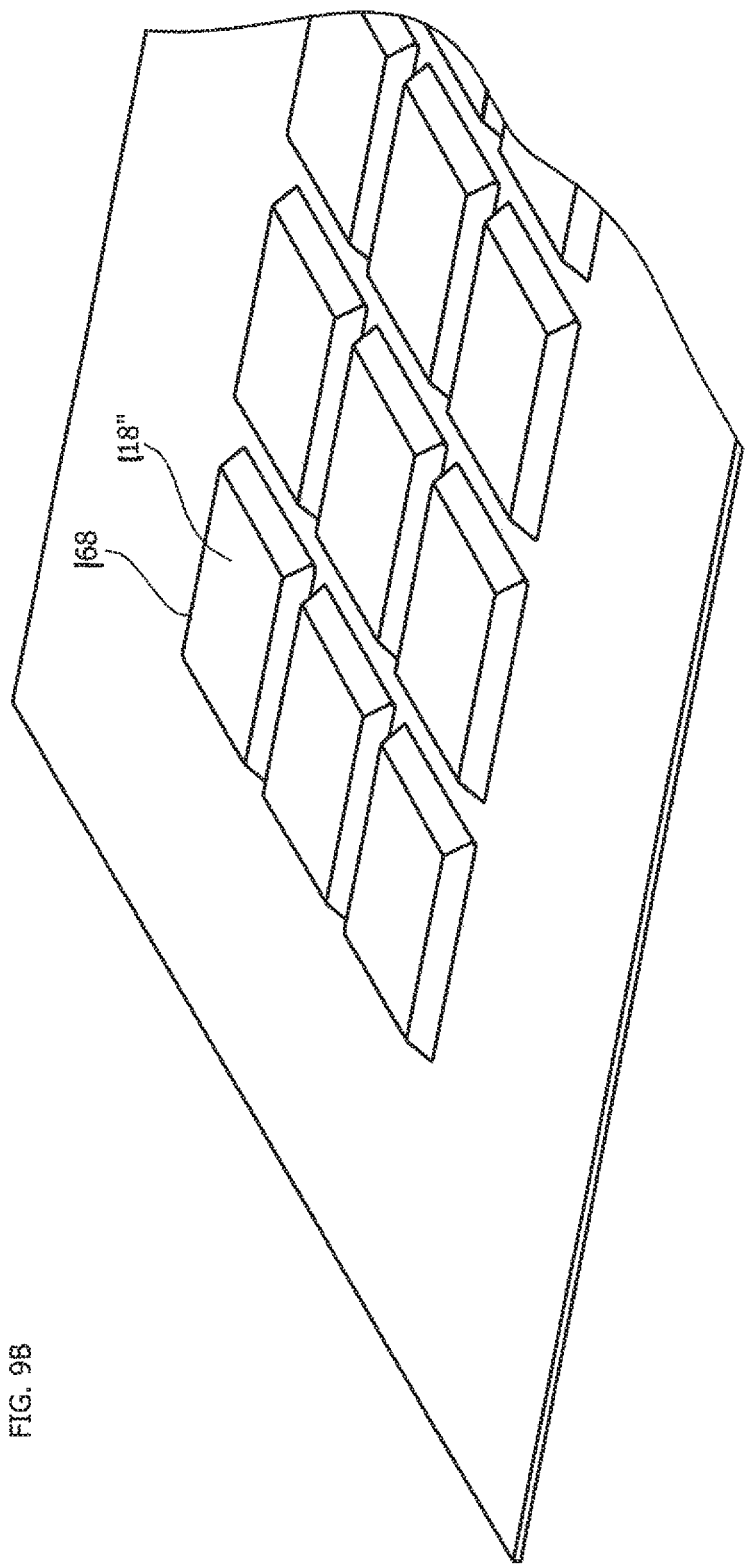
FIG. 9B is an isometric depiction of the first fastening member showing the first opposing surface of the first fastening member and the rigid bases of its associated plurality of teeth according to aspects of the exemplary embodiment of the claimed technology depicted in FIG. 8A.

Referring to FIGS. 7A and 7B, it may be advantageous to employ a slider 50 to facilitate engagement of the tooth and socket pairs 34. FIG. 7 depicts a particularly advantageous embodiment of a slider 50 according to aspects of the present technology. As those of skill in the art will recognize, the slider 50 depicted in FIG. 7 is just one of several possible variations capable of helping to facilitate engagement of the tooth and socket pairs 34.

In some embodiments, the slider 50 employs one or more first channels 52 adapted to sequentially receive each tooth 12. In embodiments wherein a single column of teeth 12 is employed, a slider 50 with a single first channel 52 is preferable, though a slider 50 with more than one first channel 52 may still be operable. The slider 50 may further employ one or more second channels 54 adapted to sequentially receive each socket 22. Again, in embodiments wherein a single column of sockets 22 is employed, a slider 50 with a single second channel 54 is preferable, though a slider 50 with more than one second channel 54 may still be operable. Where more than one first channel 52 and more than one second channel 54 are employed, it is preferable that the number of first channels 52 match the number of second channels 54. The slider 50 depicted in FIG. 7 employs three of each.

The first and second channels 52 and 54 are adapted to align the respective teeth 12 and sockets 22 laterally, parallel to the second axis (Z), to facilitate engagement of the tooth and socket pairs 34. In some embodiments, the slider's one or more first channels 52 may also be adapted to sequentially contact opposed lateral edges of the base 18 of each tooth 12 and its one or more second channels 54 may be adapted to sequentially contact opposed lateral edges of the sockets. The one of more first channels 52 connect with the one or more second channels 54 at a position 56 within the body of the slider 50, whereat the teeth 12 are engaged with the sockets 22 to form tooth and socket pairs 34. In each case, the slider 50 is adapted to induce relative rotation of tooth and socket pairs about an associated pivot access to engage and optionally disengage the tooth and socket.

Referring to FIGS. 8A-10B, in an alternative embodiment (which can be otherwise constructed according to the embodiments described above) both the tooth 112 and socket 122 have portions disposed on opposite sides of the respective first and second fastening members 110, 120. The base 118 of the tooth 112 has an inner portion 118' and an outer portion 118" disposed against inner and outer surfaces 110', 110", respectively, of the first fastening member 110, with a portion of the first fastening member 110 sandwiched therebetween. Likewise, the socket 122 has an inner portion 122' and an outer portion 122" disposed against inner and outer surfaces 120', 120", respectively, of the second fastening member 120, with a portion of the second fastening member 122 sandwiched therebetween.

The inner portion 118' of the base 118 of the tooth 112 preferably has a substantially planar portion 160 surrounding (or on one or both lateral sides of) the projecting portion 112' of the tooth 112, which planar portion 160 can be parallel to a plane defined by the X and Z axes. The inner portion 118' also preferably has a peripheral chamfered portion 162 surrounding the planar portion 118'", which slopes toward the first fastening member 110. Likewise, inner portion 122' of the socket 122 preferably has a substantially planar portion 164 surrounding (or on one or both lateral sides of) the recess 124 of the socket 122, which planar portion 164 can be parallel to a plane defined by the X an Z axis. The inner portion 122' also preferably has a peripheral chamfered portion 66 surrounding the planar portion 122'", which slopes toward the second fastening member 120.

As best seen in FIG. 8B, when a tooth 112 and socket 122 pair are engaged, the inner portion 118' of the base 118 of the tooth 112 and the inner portion 122' of the socket 122 (in particular, the planar portions 160, 164 thereof) are in abutting contact and a space or gap can exist between the first and second fastening members 110, 120 between adjacent tooth and socket pairs 134.

The inner and outer portions 118', 118" of the base 118 of the tooth 112 can be substantially square and can have substantially the same length parallel to the X axis, and are disposed such that the ends of the inner portion 118' are aligned with corresponding ends of the outer portion 118", along the X axis. Likewise, the inner and outer portions 122', 122" of the socket 122 can be substantially square and can have substantially the same length parallel to the X axis and are disposed such that the ends of the inner portion 122' are aligned with corresponding ends of the outer portion 122", along the X axis. Also, when a tooth 112 and socket 122 pair are engaged, the ends of the inner and outer portion 118', 118" of the tooth 112 are aligned with corresponding ends of the inner and outer ends 122', 122" of the socket 122, along the X axis.

As an example, the tooth 112 can be formed in one piece such as by molding the tooth 112 over (i.e., through) the first fastening member 110, in situ, such that the inner and outer portions 118', 118" of the tooth 112 are integral. Likewise the socket 122 can be integrally formed, in situ, in one piece in the same manner, such that inner and outer portions 122', 122" of the socket 122 are integral.

In an alternative embodiment, the tooth 112 can include first and second parts 168, 170 which are joined together. The first part 168 of the tooth 112 can comprise the outer portion 118" of the base 118 of the tooth 112, an interior of the inner portion 118' of the base 118 (i.e., a portion closest to/surrounding the projecting portion of the tooth), and the projecting portion of the tooth 112. The second part 170 of the tooth 112 can comprise an exterior of the inner portion 118" of the base 18, for example in the shape of a square ring with a square opening sized to receive the interior of the inner portion 118" of the tooth. To affix the tooth 112 to the first fastening member 110, the first part of the tooth 112 is inserted into an associated opening of the first fastening member 110, from the outer surface 110" thereof, until the outer portion 118" of the base 18 abuts the outer 110" surface. And, the second part of the tooth 112 is placed over the projecting portion of the tooth 112 from an inner surface 110' of the first fastening member 110 until the second part abuts the inner surface 110'. Then the first part of the tooth 112 is affixed to the second part of the tooth 112 such as by adhesive or welding, or another suitable method to affix the two parts together. When the tooth 112 is assembled, the interior and exterior of the inner portion 118' of the base 118 (on the first and second parts of the tooth, respectively) are aligned to form the substantially planar portion 118'" of the inner portion 118" of the base 118.

Likewise, in the alternative embodiment, a first part 172 of the socket 122 can comprise the outer portion 122" of the socket 122, an interior of the inner portion 122' of the socket 122 (i.e., a portion closest to/surrounding the recess), and the recess 124. A second part 174 of the socket 122 can comprise an exterior of the inner portion 122" of the socket 122, for example in the shape of a square ring with a square opening sized to receive the interior of the inner portion 120" of the socket. To affix the socket 122 to the second fastening member 120, the first part of the socket 122 is inserted into an associated opening of the second fastening member 120, from an outer surface 120" thereof, until the outer portion 122" of the socket 122 abuts the outer surface 120". And, the second part of the socket 122 is placed over the first part from an inner surface 120' of the second fastening member 120 until the second part abuts the inner surface 120'. Then, the first part of the socket 122 is affixed to the second part such as by adhesive or welding, or another suitable method to affix the two parts together. When the socket 122 is assembled, the interior and exterior of the inner portion 122' of the socket 122 (on the first and second parts of the tooth, respectively) are aligned to form the substantially planar portion 122'" of the inner portion 122" of the socket 122.

The opening of first fastening member 110 and the portion of the tooth 112 received therein are preferably sized and shaped such that there is no relative lateral movement between the tooth 112 and the opening in directions parallel to the X or Z axes. For example, the opening in the first fastening member 110 can have a square shape complementary to (and having the same dimensions as) a square cross-sectional shape of a portion of the tooth 112 received therein. Likewise, the opening of second fastening member 120 and the portion of the socket 122 received therein are preferably sized and shaped such that there is no relative lateral movement between the socket 122 and the opening in directions parallel to the X or Z axes. For example, the opening in the second fastening member 120 can have a square shape complementary to (and having the same dimensions of) a square cross-sectional shape of a portion of the socket 122 received therein.

The inner and outer portions 118', 118" of the base 118 of the tooth 112 abut the inner and outer surfaces 110', 110" of the first fastening member 110, respectively, and thus serve to fix the tooth relative to the opening of the first fastening member 110 in directions parallel to the Y axis. Likewise, the inner and outer portions 122', 122" of the socket 122 abut the inner and outer surfaces 120', 120" of the second fastening member 120, respectively, and thus serve to fix the socket relative to the opening in the second fastening member 120 in directions parallel to the Y axis.

The recess 124 of the socket 122 extends from the inner portion 122' of the socket 122, through the opening in the second fastening member 120, to the outer portion 122" of the socket. Thus, the recess 124 is disposed on both sides of the second fastening member 120. The base of the projecting portion of the tooth 112 is disposed on one side of the base 118 of the tooth. Specifically, the projecting portion of the tooth extends from the inner portion 118' of the base 118 toward the second fastening member 120.

Referring to FIG. 8B, when a series of tooth and socket pairs are engaged, the first and second surfaces 114, 116 of each tooth and the first and second wall 126, 128 of the associated socket preferably have substantially the same center of curvature 132 which is substantially equidistant adjacent tooth and socket pairs parallel to the X axis, substantially equidistant the first and second fastening members 110, 120 parallel to the Y axis, and substantially lies on a plane parallel to the X and Z axis, which plane is substantially co-planar with the abutting planar portions 160, 164 of the inner portions 118', 122' of the tooth 112 and socket 122.

Referring to FIGS. 11-22, in a further alternative embodiment (which can be otherwise constructed according to the embodiments described above) both the tooth 212 and socket 222 are affixed on or adjacent edge portions 210''', 220''' of the respective first and second fastening members 210, 220, and when the first and second fastening members 210, 220 are connected, the first and second fastening members are in a laterally adjacent, edge-to-edge configuration (See FIG. 15) (as compared to the stacked configuration of FIG. 1D).

The projecting portion 212' of the tooth 212 is preferably disposed at least partially above (Y axis) the edge portion 210''' of the first fastening member 210 and the recess 224 of the socket 222 is disposed laterally (Z direction) from the edge portion 220''' (toward the tooth 212) and above a plane of the second fastening member 220 such that, when the first and second fastening members 210, 220 are connected, the socket 222 extends over the first fastening member 210 and the first and second fastening members 210, 220 are in the aforementioned edge-to-edge alignment.

The base 218 of the tooth 212 projects laterally to one side (Z axis) and longitudinally on both sides of the projecting portion 212' of the tooth 212 and forms a channel 219 open on one lateral side and on two longitudinal sides (X axis), and the channel is adapted to closely receive the edge 210''' of the first fastening member 210. The base 218 has a top portion 218' and a bottom portion 218" disposed against top and bottom surfaces 210', 210", respectively, of the first fastening member 210, with the edge portion 210''' of the first fastening member 210 sandwiched therebetween. The base 218 of the tooth 212 has a side portion 218''' which interconnects the top and bottom portions 218', 218" and closes a bottom (i.e., trough) of the channel 219 thereby covering the edge 210''' of the first fastening member.

The socket 222 has a similar base 223. The base 223 of the socket 222 projects laterally to one side (Z axis) of the recess 224 of the socket and forms a channel 229 open on one lateral side (along the Z axis) and on two longitudinal sides (X axis) and the channel is adapted to closely receive the edge portion 220''' of the second fastening member 220. The base 223 has a top portion 223' and a bottom portion 223" disposed against top and bottom surfaces 220', 220", respectively, of the second fastening member 220, with the edge portion 220''' of the second fastening member 220 sandwiched therebetween. The base 223 of the socket 222 has a side portion 223''' which interconnects the top and bottom portions 223', 223" and closes a bottom (i.e., trough) of the channel 229 thereby covering the edge 220''' of the first fastening member.

The first and second walls 226, 228, which partially define the recess 224 of the socket 222, are laterally disposed from the base 223 and from the edge portion 220''' of the second fastening member 220. A first longitudinal side wall 225 of the socket 222 is connected to the base 223. A second longitudinal side wall 225' is spaced laterally from the first longitudinal side wall 225 (i.e., along the Z axis) and is connected to the first longitudinal side wall 225 by the first and second walls 226, 228 which are spaced apart in the longitudinal direction (X axis). Thus, the second longitudinal side wall 225' and at least distal portions of the first and second walls 226, 228 are spaced laterally from the base 223 of the socket 222 and are supported from the base 223 in a cantilevered manner.

The top portion 218' of the base 218 of the tooth 212 preferably has a substantially planar portion 260 surrounding (or on one or both lateral and/or longitudinal sides of) the projecting portion 212' of the tooth 212, which planar portion 260 can be parallel to a plane defined by the X and Z axes. The socket 222 can have a bottom portion 227 comprised of bottom surfaces of the second lateral wall 225' and the first and second walls 226, 228. The bottom portion 227 of the socket 222 preferably has a substantially planar portion 264 partially surrounding the recess 224 of the socket 222 (for example on one or both lateral and longitudinal sides of), which planar portion 264 can be parallel to a plane defined by the X an Z axis. The.

Figures 15, 16:
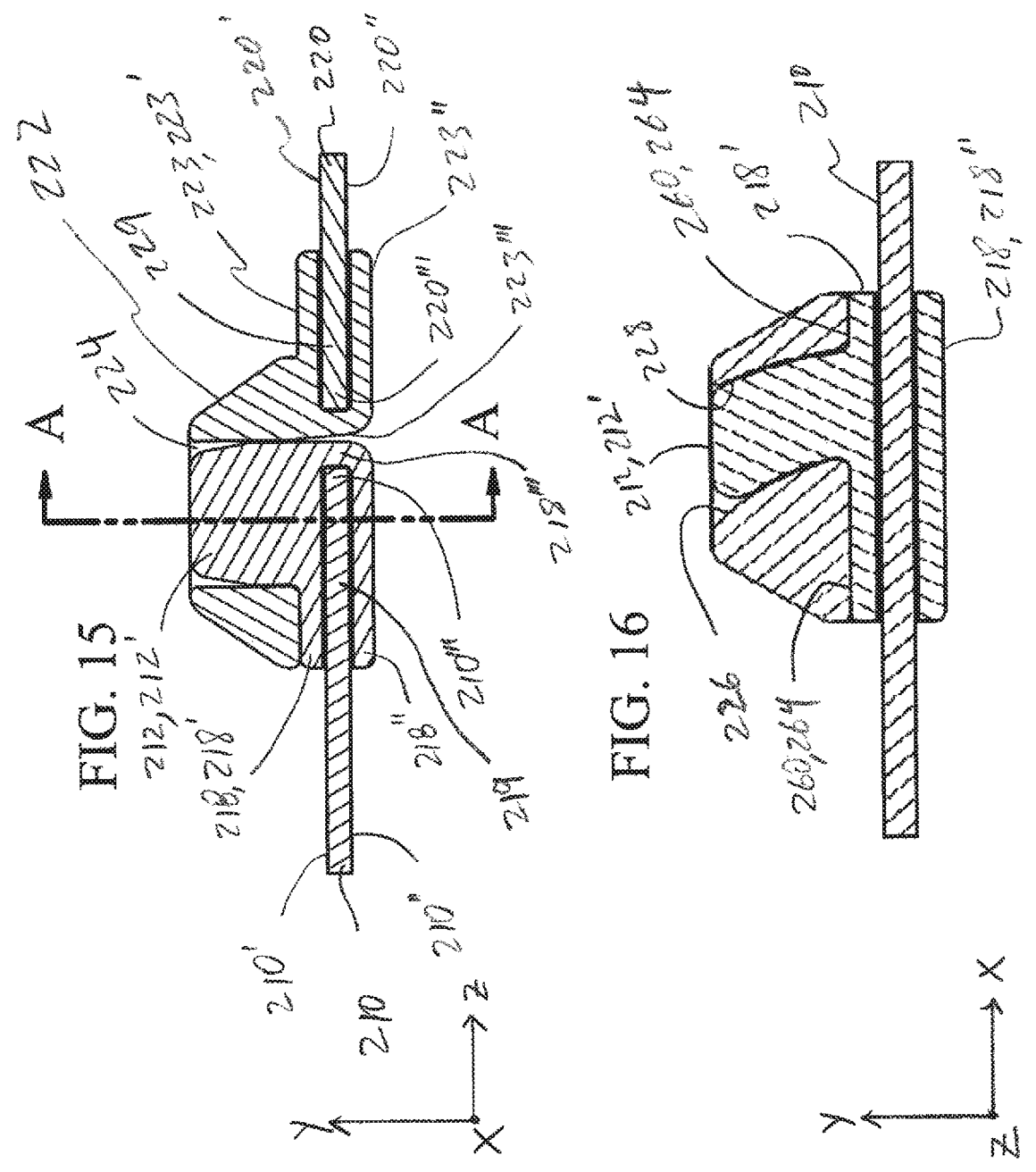
Figure 19:
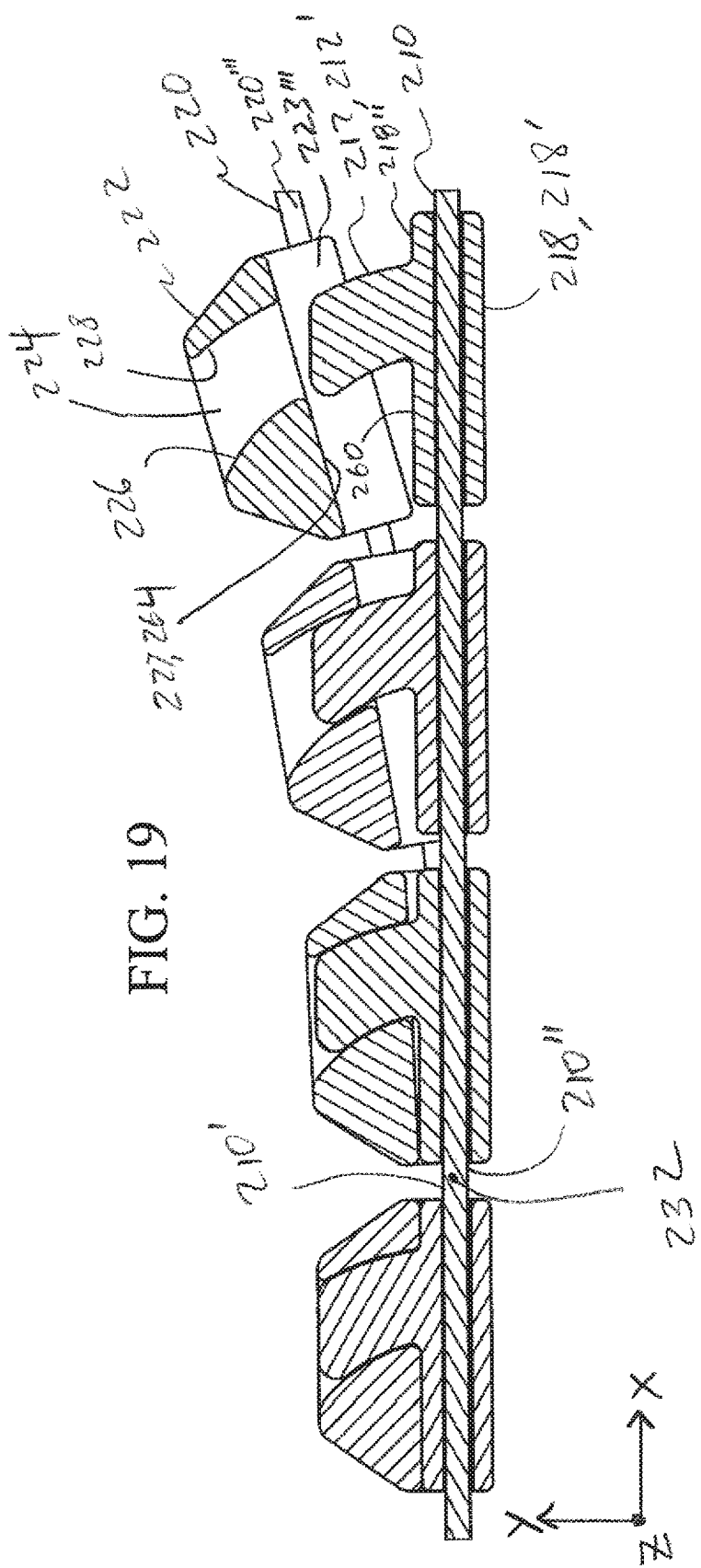
FIG. 19 is a lateral cross section view showing tooth and socket pairs in engaged and disengaged states.

As best seen in FIGS. 15 and 19, when a tooth 212 and socket 222 pair are engaged, the top portion 218' of the base 218 of the tooth 212 and the bottom portion 227 of the socket 222 (in particular, the planar portions 260, 264 thereof) are in abutting contact. In addition, the side portions 218''', 223''' of the respective bases 218, 223 of the tooth 212 and 222 are in closely abutting contact intermediate the edge portions 210''', 220''' of the first and second fastening members 210, 220.

The top and bottom portions 218', 218" of the base 218 of the tooth 212 can be substantially square or rectangular (as viewed from above or below along the Y axis) and can have substantially the same length parallel to the X axis, and are disposed such that the longitudinal ends of the top portion 218' are aligned with corresponding ends of the bottom portion 118", along the X axis. Likewise, the top and bottom portions 223', 223" of the socket 222 can be substantially square or rectangular and can have substantially the same longitudinal length parallel to the X axis and are disposed such that the longitudinal ends of the top portion 223' are aligned with corresponding ends of the bottom portion 223", along the X axis. Also, when a tooth 212 and socket 222 pair are engaged, the ends of the top and bottom portion 218', 218" of the tooth 212 are aligned with corresponding ends of the top and bottom portions 223', 223" of the socket 222, along the X axis.

As an example, the tooth 112 can be formed in one piece such as by molding the tooth 112 over the edge portion 210''' of the first fastening member 210, in situ, such that the base 218 (including the top and bottom portions 218', 218" and the side portion 218''') and the projecting portion 212' of the tooth 212 are integral. Likewise the socket 222 can be integrally formed, in situ, in one piece in the same manner, such that the base 223 (including the top and bottom portions 223', 223" and the side portion 223"), the first and second longitudinal walls 225, 225', and the first and second walls 226, 228 of the socket 222 are integral.

Referring to FIG. 19, when a series of tooth and socket pairs are engaged, the first and second surfaces 214, 216 of each tooth and the first and second wall 226, 228 of the associated socket preferably have substantially the same center of curvature 232 (or axis of curvature parallel to the Z axis) which can be substantially equidistant adjacent tooth and socket pairs parallel to the X axis, and/or within the first fastening member (e.g., between or substantially equidistant the top and bottom surfaces 210', 210" of the first fastening members 210, parallel to the Y axis), and/or substantially lying on a plane parallel to the X and Z axis, which plane is below the abutting planar portions 260, 264 of the top and bottom portions 218', 227 of base 218 of the tooth 212 and socket 222.

Referring to FIGS. 20-22, in an embodiment, the fastening device can include a slider 250 adapted for the above configuration of teeth 212 and sockets 222. The slider can have a first channel 252 adapted to sequentially receive each tooth 212 and a second channel 254 adapted to sequentially receive each socket 222. The first and second channels 252, 254 are adapted to align the respective teeth 212 and sockets 222 laterally, parallel to the second axis (Z), to facilitate engagement of the tooth and socket pairs 234. The first channel 252 of the slider 250 may also be adapted to sequentially contact opposed lateral edges of the base 218 of each tooth 212 and the second channel 254 may be adapted to sequentially contact opposed lateral edges of the sockets 222. The first channel 252 can connect with the second channels 254 at a connecting position within the body of the slider 250, whereat the teeth 212 are engaged with the sockets 222 to form tooth and socket pairs 234. The slider 250 is adapted to induce relative rotation of tooth and socket pairs about an associated pivot access, as described herein, to engage and optionally disengage the tooth 212 and socket 222.

While in the embodiment depicted in FIGS. 11-19 show the tooth 212 disposed above the first fastening member 210 and the socket 222 extending laterally from the second fastening member 220 and over the first fastening member 210, other configurations of the fastening device are contemplated for the same result. For example, in an alternate configuration (not shown) the recess 224 of the socket 222 can be disposed entirely (or partially) over the second fastening member 220 and the tooth 212 (and/or the projecting portion 212' thereof) can extend over the second fastening member 220, while maintaining the aforementioned edge-to-edge alignment of the first and second fasting members 210, 220.

While the present technology has been described with reference to particular embodiments and arrangements of parts, features, and the like, the present technology is not limited to these embodiments or arrangements. Indeed, many modifications and variations will be ascertainable to those of skill in the art, all of which are inferentially included in these teachings.

What is claimed is:

1. A fastening device, comprising:
a first fastening member having a plurality of teeth;
a second fastening member having a plurality of sockets, each socket having a recess sized and shaped to receive and engage with one of the plurality of teeth;
the plurality of teeth and sockets being sequentially engagable in tooth and socket pairs, in an engagement direction parallel to a first axis (X) which is orthogonal to second (Z) and third (Y) orthogonal axes;
each tooth and socket pair being adapted for engagement by relative rotation of the associated tooth and socket;
each tooth having a first surface and having a second surface spaced from the first surface in the engagement direction and fixed relative to the first surface;
each recess being defined at least in part by a first wall of the socket and a second wall of the socket, the second wall of the socket being spaced from the first wall in the engagement direction and being rigidly interconnected to and fixed relative to the first wall such that the space between the first and second wall remains constant during engagement and disengagement of the tooth and socket;
each tooth and socket pair having an engaged position wherein the associated tooth is received within the recess of the associated socket; and
in the engaged position the associated tooth and socket cooperating to prevent relative movement of the associated tooth and socket parallel to the first axis (X) and third axis (Y).

2. A fastening device, as in claim 1, wherein:
upon engagement of a tooth and socket pair, the first and second surfaces of the associated tooth closely abut the respective first and second walls of the associated recess and prevent relative movement of the associated tooth and socket parallel to the first axis (X), and a portion of the first wall of the socket closely abutting the first surface of the associated tooth is disposed between the associated tooth and a portion of the first fastening member in a direction parallel to the third axis (Y) and prevents relative separation of the associated tooth and socket parallel to the third axis (Y).

3. A fastening device, as in claim 2, wherein:
upon engagement of a first tooth and socket pair, relative movement of a tooth and socket of a second tooth and socket pair sequential to the first tooth and socket pair in the engagement direction being thereby substantially limited to relative rotational movement about a first pivot axis parallel to the second axis (Z), and the tooth and socket of the second tooth and socket pair being adapted for engagement by relative pivoting movement about the first pivot axis; and
upon subsequent engagement of the second tooth and socket pair, relative movement of a tooth and socket of a third tooth and socket pair sequential to the second tooth and socket pair in the engagement direction being thereby substantially limited to relative rotation about a second pivot axis parallel to the second axis (Z), and the tooth and socket of the third tooth and socket pair being adapted for engagement by relative pivoting movement about the second pivot axis, and subsequent engagement of the third tooth and socket pair being operable to substantially prevent relative rotation of the tooth and socket of the second tooth and socket pair about the first pivot axis.

4. A fastening device, as in claim 3, wherein:
the first surface of each tooth has a profile as viewed parallel to the second axis (Z), and at least a portion of the profile of the first surface is concave and has a center of curvature on an associated tooth center of curvature; and
upon engagement of the first tooth and socket pair, the tooth center of curvature of the tooth of the second tooth and socket pair is substantially disposed on the first pivot axis.

5. A fastening device, as in claim 4, wherein:
the first wall of the recess of each socket has a profile as viewed parallel to the second axis (Z), and at least a portion of the profile of the first wall is convex complementary to the first surface and has a center of curvature on a socket center of curvature; and
in the engaged position of each tooth and socket pair, the tooth center of curvature of the associated tooth and the socket center of curvature of the associated socket are substantially located at the same point.

6. A fastening device, as in claim 5, wherein:
the second surface of each tooth has a profile as viewed parallel to the second axis (Z), and at least a portion of the profile of the second surface is convex and has a center of curvature on the associated tooth center of curvature; and
the second wall of the recess of each socket has a profile as viewed parallel to the second axis (Z), and at least a portion of the profile of the second wall is concave complementary to the second surface and has a center of curvature on the socket center of curvature.

7. A fastening device, as in claim 5, wherein:
the plurality of teeth includes a first tooth and a second tooth sequential to the first tooth in the engagement direction, the tooth center of curvature of the second tooth being between the first tooth and the second tooth;
the plurality of sockets includes a first socket and a second socket sequential to the first socket in the engagement direction, the socket center of curvature of the second socket being between the first socket and the second socket; and
either:
(a) the first fastening member is flexible and adapted to substantially limit movement of the second tooth relative to the first tooth to relative rotation about a tooth pivot substantially on the tooth center of curvature of the second tooth; or
(b) the second fastening member is flexible and adapted to substantially limit movement of the second socket relative to the first socket to relative rotation about a socket pivot substantially on the socket center of curvature of the second socket.

8. A fastening device, as in claim 7, wherein:
each first and second tooth includes a base, the base being rigid and extending from a proximal end of the associated tooth parallel to the first axis (X);
the tooth pivot comprises a first flexible portion disposed between and interconnecting the base of the first tooth to the base of the second tooth; and
a length of the first flexible portion is less than a length of the base of each first and second tooth, the lengths being measured in the engagement direction.

9. A fastening device, as in claim 7, wherein:
each of the first and second sockets is rigid, and the socket pivot comprises a second flexible portion disposed between and interconnecting the first socket to the second socket; and
a length of the second flexible portion is less than a length of each first and second socket, the lengths being measured in the engagement direction.

10. A fastening device, as in claim 8, wherein the tooth pivot is adjacent to an interface between the base of the second tooth and the first flexible portion.

11. A fastening device, as in claim 9, wherein the socket pivot is adjacent to an interface between the second socket and the second flexible portion.

12. A fastening device, as in claim 1, wherein:
the first fastening member comprises a first web, the first web being flexible and having first and second opposed surfaces and a plurality of holes extending therethrough;
each tooth includes a rigid base extending parallel to the first axis (X) from a proximal end of the tooth, the base of each tooth being affixed to the first surface of the first web, and the associated tooth extending through one of the plurality of holes of the first web and protruding from the second surface of the first web;
the second fastening member comprising a second web, the second web being flexible and having first and second opposed surfaces and a plurality of holes extending therethrough;
each socket is disposed on the first surface of the second web, and each recess is aligned with one of the plurality of holes of the second web; and
when a tooth and socket pair is in the engaged position, the tooth extends through the associated hole in the second web and into the recess of the socket.

13. A fastening device, as in claim 1:
wherein the plurality of teeth includes a first column of teeth aligned in the engagement direction and the plurality of sockets includes a first column of sockets aligned in the engagement direction; and
comprising a slider adapted for sequential engagement and disengagement of the first column of teeth and the first column of sockets in the engagement and disengagement directions, respectively;
the slider having a first channel adapted to sequentially receive each tooth of the first column of teeth and having a second channel adapted to sequentially receive each socket of the first column of sockets; and
the first and second channels being adapted to positively align the first column of teeth with the first column of sockets along a lateral axis parallel to the second axis (Z).

14. A fastening device, as in claim 13, wherein:
the first channel is adapted to sequentially contact opposed lateral edges of the base of each tooth of the first column of teeth to align the first column of teeth along the lateral axis; and
the second channel is adapted to sequentially contact opposed lateral edges of each socket of the first column of sockets to align the first column of sockets along the lateral axis.

15. A fastening device, as in claim 1, wherein:
the plurality of teeth of the first fastening portion are arranged in a rectangular array of regularly spaced columns and rows; and
the plurality of sockets of the second fastening portion are arranged in a rectangular array of regularly spaced columns and rows, complementary to the plurality of teeth.

16. A fastening device, as in claim 6, wherein:
each tooth has a constant cross section over a substantial length of the tooth, said cross section taken parallel to a plane defined by a radius of curvature of the profile of the first surface of the tooth and the second axis (Z); and
each recess has a constant cross section over a substantial length of the recess, said cross section taken parallel to a plane defined by a radius of curvature of the profile of the first wall of the recess and the second axis (Z).

17. A fastening device, as in claim 1, wherein the recess of each socket extends through the socket from a proximal end to a distal end of the socket.

18. A fastening device, as in claim 6, wherein:
the first and second surfaces of each tooth have a partially cylindrical shape with a common axis of curvature which is parallel to the second axis (Z) and passes through the tooth center of curvature, where the first surface is concave and the second surface is convex; and the first wall and second walls of each socket have a partially cylindrical shape with a common axis of curvature which is parallel to the second axis (Z) and passes through the socket center of curvature, where the first wall is convex and the second wall is concave.

19. A fastening device, comprising:

a first fastening member having a plurality of teeth;

a second fastening member having a plurality of sockets, each socket having a recess sized and shaped to receive and engage with one of the plurality of teeth;

the plurality of teeth and sockets being sequentially engagable in tooth and socket pairs, in an engagement direction parallel to a first axis (X) which is orthogonal to second (Z) and third (Y) orthogonal axes;

each tooth and socket pair being adapted for engagement by relative rotation of the associated tooth and socket;

each tooth having a first surface and having a second surface spaced from the first surface in the engagement direction and fixed relative to the first surface;

each recess being defined at least in part by a first wall of the socket and a second wall of the socket, the second wall of the socket being spaced from the first wall in the engagement direction and being rigidly interconnected to and fixed relative to the first wall such that the space between the first and second walls remain constant during engagement and disengagement of the tooth and socket;

each tooth and socket pair having an engaged position wherein the associated tooth is received within the recess of the associated socket;

in the engaged position the associated tooth and socket cooperating to prevent relative movement of the associated tooth and socket parallel to the first axis (X) and third axis (Y);

the first surface of each tooth has a profile as viewed parallel to the second axis (Z), and at least a portion of the profile of the first surface is concave and has a center of curvature on an associated tooth center of curvature;

upon engagement of a first tooth and socket pair, the tooth center of curvature of the tooth of a second tooth and socket pair is substantially disposed on the first pivot axis, where the second tooth and socket pair is sequential to the first tooth and socket pair in the engagement direction;

the first wall of the recess of each socket has a profile as viewed parallel to the second axis (Z), and at least a portion of the profile of the first wall is convex complementary to the first surface and has a center of curvature on a socket center of curvature; and in the engaged position of each tooth and socket pair, the tooth center of curvature of the associated tooth and the socket center of curvature of the associated socket are substantially located at the same point.

20. A fastening device, as in claim 1, wherein:

each tooth having a base and a portion of the first fastening member being disposed within the base of the tooth;

each socket having a base and a portion of the second fastening member being disposed within the base of the socket; and the base of the tooth contacting the base of the socket of an associated tooth and socket pair when the associated tooth and socket pair are connected.

21. A fastening device, as in claim 20, wherein:

the recess of each socket extends through an associated opening of the second fastening member.

22. A fastening device, as in claim 20, wherein:

each tooth is disposed on an edge portion of the first fastening member;

each socket is disposed on an edge portion of the second fastening member;

when a tooth and socket pair is connected, the first and second fastening members adjacent thereto are substantially coplanar.

23. A fastening device, as in claim 22, wherein:

the base of each tooth has a channel adapted to receive the edge portion of the first fastening member and a side wall of the base of the tooth forms a trough of the channel;

the base of each socket has a channel adapted to receive the edge portion of the second fastening member and a side wall of the base of the socket forms a trough of the channel; and when the tooth and socket pair is connected, the respective side walls of the bases of the tooth and socket are closely abutting.

24. A fastening device, as in claim 20, wherein:

the base of each tooth having a substantially planar top portion;

the base of each socket having a substantially planar bottom portion; and the top portion of the base of the tooth of the associated tooth and socket pair contacting the bottom portion of the base of the socket of the associated tooth and socket pair, when the associated tooth and socket pair are connected.

* * * * *